United States Patent

Tagawa

[11] Patent Number: 5,438,889
[45] Date of Patent: Aug. 8, 1995

[54] BICYCLE SPEED CHANGE OPERATION ASSEMBLY

[75] Inventor: Koichi Tagawa, Kawachinagano, Japan

[73] Assignee: Mory Suntour Inc., Osaka, Japan

[21] Appl. No.: 211,354

[22] PCT Filed: Jul. 26, 1994

[86] PCT No.: PCT/JP93/01047
§ 371 Date: Mar. 21, 1994
§ 102(e) Date: Mar. 21, 1994

[87] PCT Pub. No.: WO94/02348
PCT Pub. Date: Feb. 3, 1994

[30] Foreign Application Priority Data

Jul. 28, 1992 [JP] Japan ................. 4-201048

[51] Int. Cl.6 ............ B62M 25/04; B62K 11/14; B62K 23/04
[52] U.S. Cl. ........................ 74/475; 74/489; 74/527
[58] Field of Search .......... 74/475, 489, 502.2, 74/527

[56] References Cited

U.S. PATENT DOCUMENTS 3,972,247 8/1976 Armstrong .............. 74/489
5,102,372 4/1992 Patterson et al. ........... 474/80

FOREIGN PATENT DOCUMENTS 0392457 10/1990 European Pat. Off. .
60-60389 4/1985 Japan .
61-60387 3/1986 Japan .
1-65783 4/1989 Japan .

Primary Examiner—Allan D. Herrmann
Attorney, Agent, or Firm—Michael D. Bednarek; Marks & Murase

[57] ABSTRACT

With an object of providing a bicycle speed change operation assembly capable of providing an overshifting function only at a speed step requiring thereof as well as generating no unnecessary engaging sound, the following technical means are provided: The bicycle speed change operation assembly includes a retaining member (34) rotatable integrally with a speed change operation member (14), an engaging member (34) engagable with the retaining member for retaining the speed change operation member at a predetermined rotational position, and a regulating member (33b) juxtaposed to one of the retaining member and the engaging member with a predetermined play relative thereto while being engagable with the other of the retaining member and the engaging member for retaining the speed change operation member at a predetermined rotational position.

12 Claims, 35 Drawing Sheets

BICYCLE SPEED CHANGE OPERATION ASSEMBLY

FIELD OF INVENTION

The present invention relates to a bicycle speed change operation assembly, and more specifically to a bicycle speed change operation assembly inclding a stepwise retaining mechanism wherein overshifting function is provided only at a speed step requiring thereof while unnecessary engaging sound is not generated.

BACKGROUND ART

A rear derailleur (rear speed shifter), for example, includes a chain guide supporting a guide pulley and a tension pulley for moving axially of a multiple free wheel by means of a control mechanism such as a pantograph link mechanism. A chain is engaged with the tension pulley and the guide pulley, and then engaged with the free wheel. When the chain guide is moved for shifting the guide pulley axially of the free wheel, the chain is shifted to a sprocket located right above the guide pulley. A rear derailleur of the above type is actuated by means of a control cable which is wound or paid out by operating a speed control lever.

The speed control lever generally comprises a bossed base portion having a cable winding groove, and an arm portion extending outward radially from the bossed base portion. The speed control lever is pivotally supported at its bossed base portion around a shaft provided at a suitable portion of a bicycle body. When the arm portion is pressed for rotating the bossed base portion, the control cable is wound around or paid out from the cable winding groove, generating an axial movement of the control cable corresponding to an amount of pivotal operation of the arm portion. The axial movement of the control cable causes a corresponding deformation of the control mechanism, causing the chain guide of the rear derailleur to be guided to a position axially of the free wheel corresponding to the amount of pivotal operation of the speed control lever.

The chain guide is moved continuously in response to an operation of the speed control lever. For this reason, a very high level of skill is required for quickly and assuredly guiding the chain guide to an appropriate position to each sprocket.

For example, when the chain guide is placed at an intermediate position between two adjacent sprockets, the chain is inclined as it runs from the guide pulley to the free wheel. As a result, the chain rubs against a guide plate, for instance, generating an unpleasant gear noise. A rider must therefore perform fine adjustment of the speed control lever so that the chain guide is guided at an appropriate position to a desired sprocket and that the gear noise or accompanying chain vibration ceases.

In order to improve operability of the speed change operation lever, there is provided a speed change operation assembly incorporating a click mechanism, wherein the control lever is held stepwise at rotational positions respectively corresponding to speed shift positions. In such a speed change operation assembly, the speed control lever can be held at predetermined rotational positions with assuredness. At each of the rotational positions, the chain guide or guide pulley is assuredly moved to an appropriate position to the corresponding sprocket, that is, the position right beneath that sprocket. This allows any rider to perform a speed change operation accurately and quickly.

For further improvement in speed change operability, an overshifting mechanism may sometimes be provided.

When an speed change operation is made, the overshifting mechanism causes the chain guide to be moved slightly more, shifting the chain beyond the predetermined position right beneath the desired sprocket, so that the chain is quickly engaged with a desired diametrically larger sprocket adjacent to the sprocket with which the chain was previously engaged. By providing the overshifting mechanism, speed change operability from a diametrically smaller sprocket to a diametrically larger sprocket is greatly improved.

For instance, the Japanese Utility Model Laid-open Hei 1-65783 discloses a click mechanism comprising an engaging member supported around a lever shaft, and a click plate provided with a plurality of engaging portions for successive engagement with the engaging member responsive to the rotational operation of a speed control lever. In this click mechanism, an overshifting mechanism includes predetermined play about an axis between the click plate and the lever, or a predetermined play with which the engaging member is held to the lever shaft.

However, such an overshifting mechanism provides an overshifting function at every speed position, causing inconveniences.

Especially, when the chain is shifted from a diametrically intermediate sprocket to a diametrically largest sprocket, the overshifting function often causes the chain to fall outward laterally of the diametrically largest sprocket. For this reason, in a conventional click mechanism, it was impossible to provide a sufficient amount of overshift when the chain is shifted from a diametrically smallest sprocket to a diametrically intermediate sprocket, resulting in insufficient overshifting function.

The click mechanism holds the speed control lever at predetermined rotational angular positions with positive feeling of assuredness as well as generating an engaging sound when the engaging portion is engaged with the engaging member. Thus, for performing a quick speed change operation, the rider must move the speed control lever further in the cable winding direction beyond its rotational position where the click mechanism generates the engaging sound to a position where the overshifting function is performed.

However, a rider is often mislead by the engaging sound to a belief that the speed change operation is completed, and therefore, stops operating the speed change lever when the generation of the engaging sound is heard. As a result, it was often likely that the overshifting function is not performed sufficiently, and in addition, speed change operability was even deteriorated.

Especially in a front speed shifter, since a rotational speed of the sprockets is slower than those on a rear wheel, it is necessary to hold the speed control lever at an overshift position for a significantly longer period of time. For this reason, it has been difficult to make sufficient advantage of the overshifting mechanism in a front speed shifter.

DISCLOSURE OF THE INVENTION

It is therefore an object of the present invention to provide a bicycle speed change operation assembly wherein an overshifting function is provided only at a speed position where necessary. Another object of the present invention is to provide a bicycle speed change operation assembly provided with a stepwise click mechanism which does not generate unnecessary engaging sound.

The present invention provides a bicycle speed change operation assembly comprising a speed change operation member rotatably supported at a suitable portion of a bicycle body, and a stepwise retaining mechanism for retaining the speed change operation member stepwise at predetermined rotational positions; the speed change operation member being rotated to pull or pay out a control cable for activating a speed shifter; wherein the stepwise retaining mechanism includes:

a retaining member rotatable integrally with the speed change operation member:

an engaging member engagable with the retaining member for retaining the speed change operation member at a predetermined rotational position: and a regulating member juxtaposed to one of the retaining member and the engaging member with a predetermined play relative thereto while being engagable with the other of the retaining member and the engaging member for retaining the speed change operation member at a predetermined rotational position.

Other objects, characteristics and advantages of the present invention will become clear from the description of the preferred embodiments to be described hereinafter referring to the attached figures.

BEST MODE FOR CARRYING OUT THE INVENTION

The best mode for carrying out the present invention will now be described specifically, referring to the attached figures.

Figure 1:
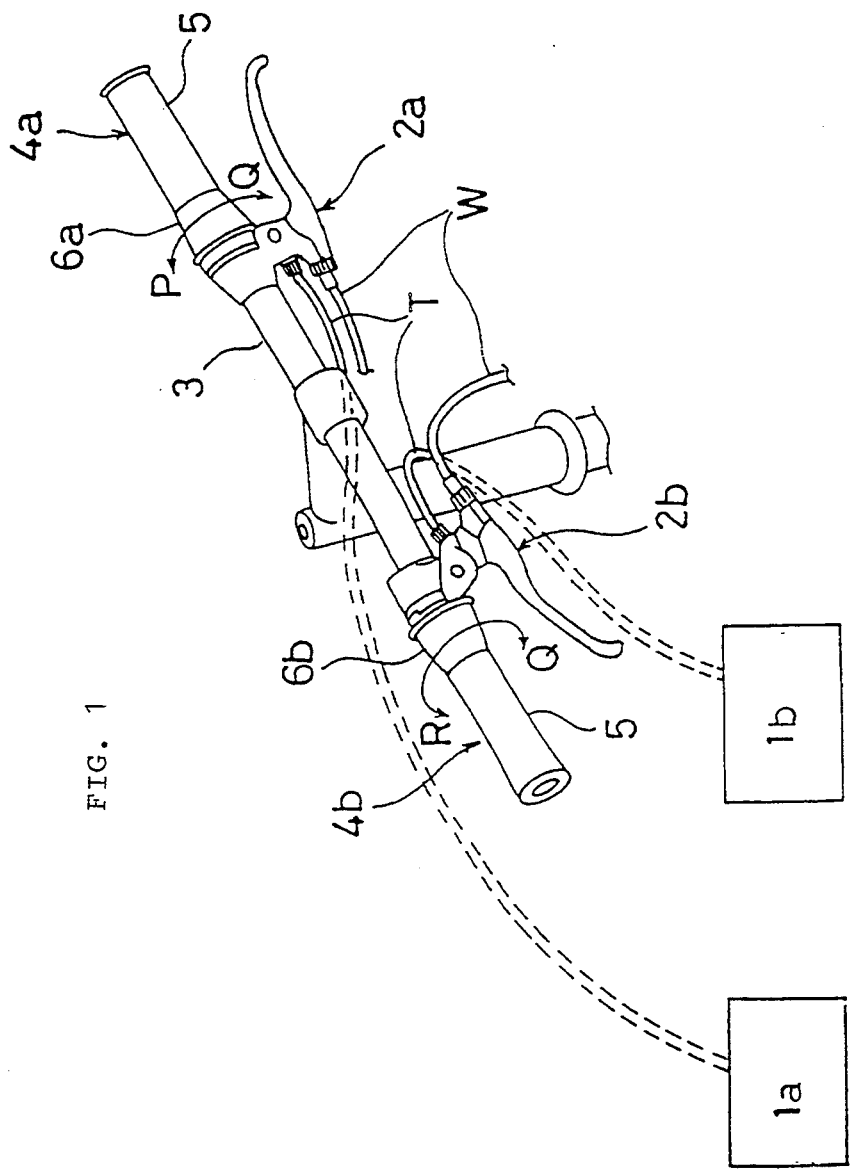
FIG. 1 is a view showing an overall arrangement of a speed change system to which speed change operation assemblies according to the present invention is applied.

As shown in FIG. 1, a bicycle having a rear speed shifter 1a and a front speed shifter 1b is provided with speed change operation assemblies 6a, 6b according to the present embodiments respectively at right and left brake lever assemblies 2a, 2b or at right and left grip portions 4a, 4b of the handlebar 3.

The following description will be made for a case wherein the present invention is applied to the right side speed change operation assembly for actuating the front speed shifter 1b. A similar arrangement may be applied to the left side speed change operation assembly 6a for actuating the rear speed shifter 1b.

Figure 2:
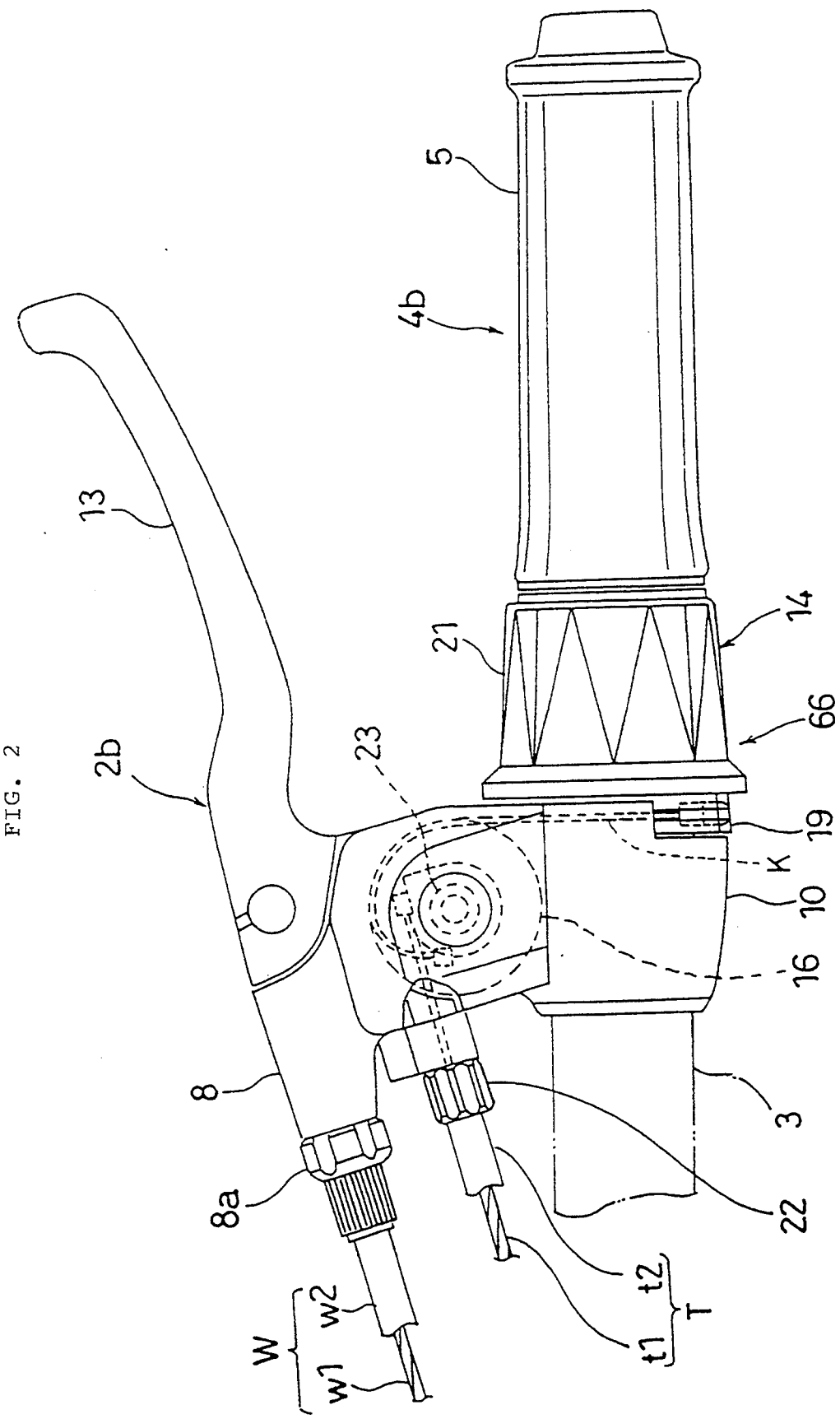
FIG. 2 is a plan view of a speed change operation assembly according to the present invention.
Figure 3:
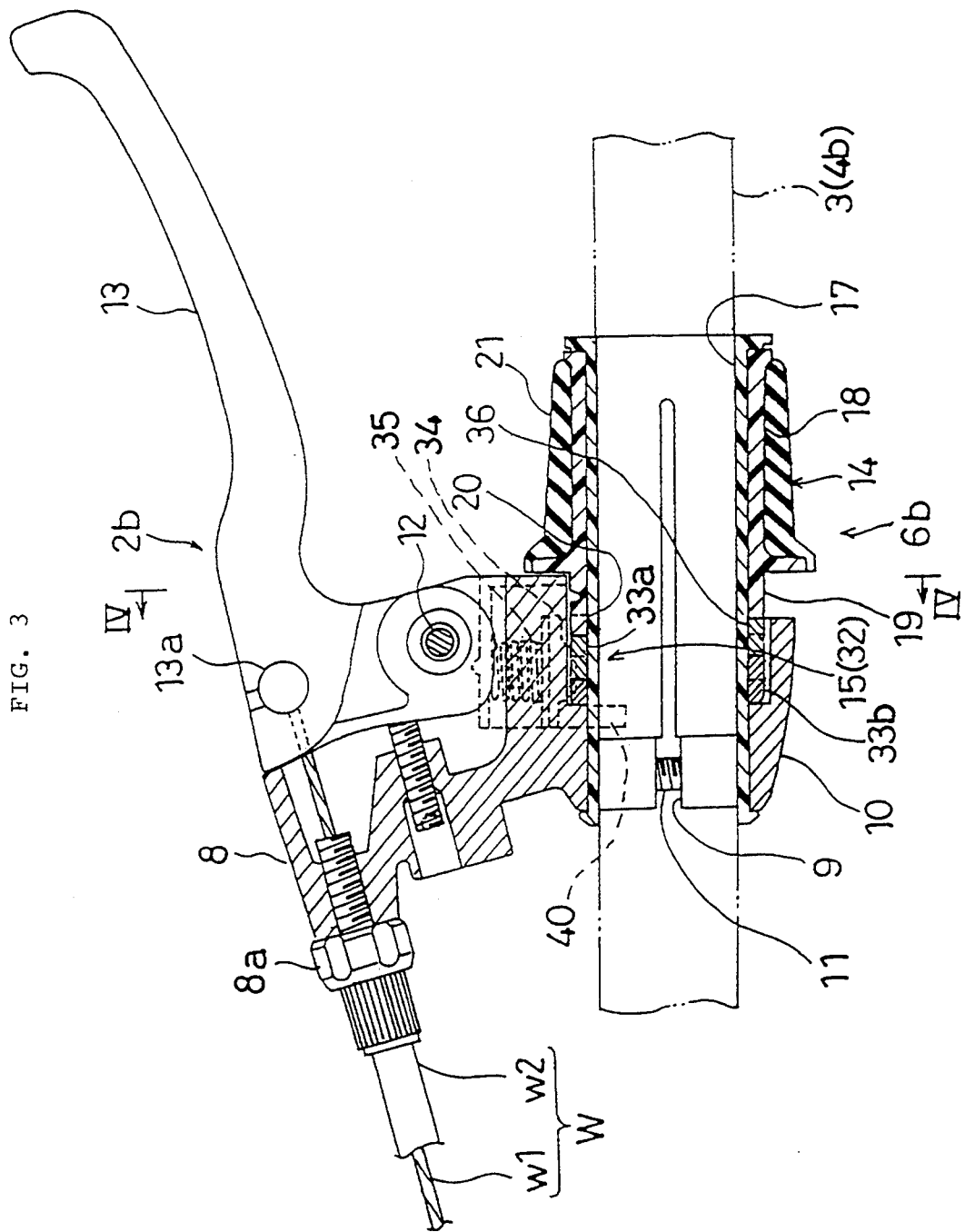
FIG. 3 is an axial cross-sectional view of the speed change operation assembly shown in FIG. 2.

FIG. 2 is a plan view of the speed change operation assembly 6b, whereas FIG. 3 is an axial cross-sectional view of the speed change operation assembly 6b. As shown in these Figs., the speed change operation assembly 6b is made integrally with the brake lever assembly 2b from the brake bracket 8 to the grip portion 4b.

As shown in FIG. 3, the brake bracket 8 is provided at its base end portion with a cylindrical mount 10 having a slit 9 formed by cutting off a circumferential wall. A handlebar 3 is inserted at its end with a cylindrical sleeve member 17 made of resin for rotatably supporting a cylindrical operation member 14 to be described later for functioning as a speed change control member. The cylindrical mount 10 is inserted around the sleeve member 17. A fixing bolt 11 inserted across the slit 9 is tightened to forcedly shrink an inner diameter of the cylindrical mount 10, thereby fixing the sleeve member 17 and the brake bracket 8 integrally with the handlebar 3.

The speed change operation assembly 1b generally comprises the cylindrical operation member 14, a stepwise retaining mechanism 15, and a cable winding reel 16.

Figure 7:
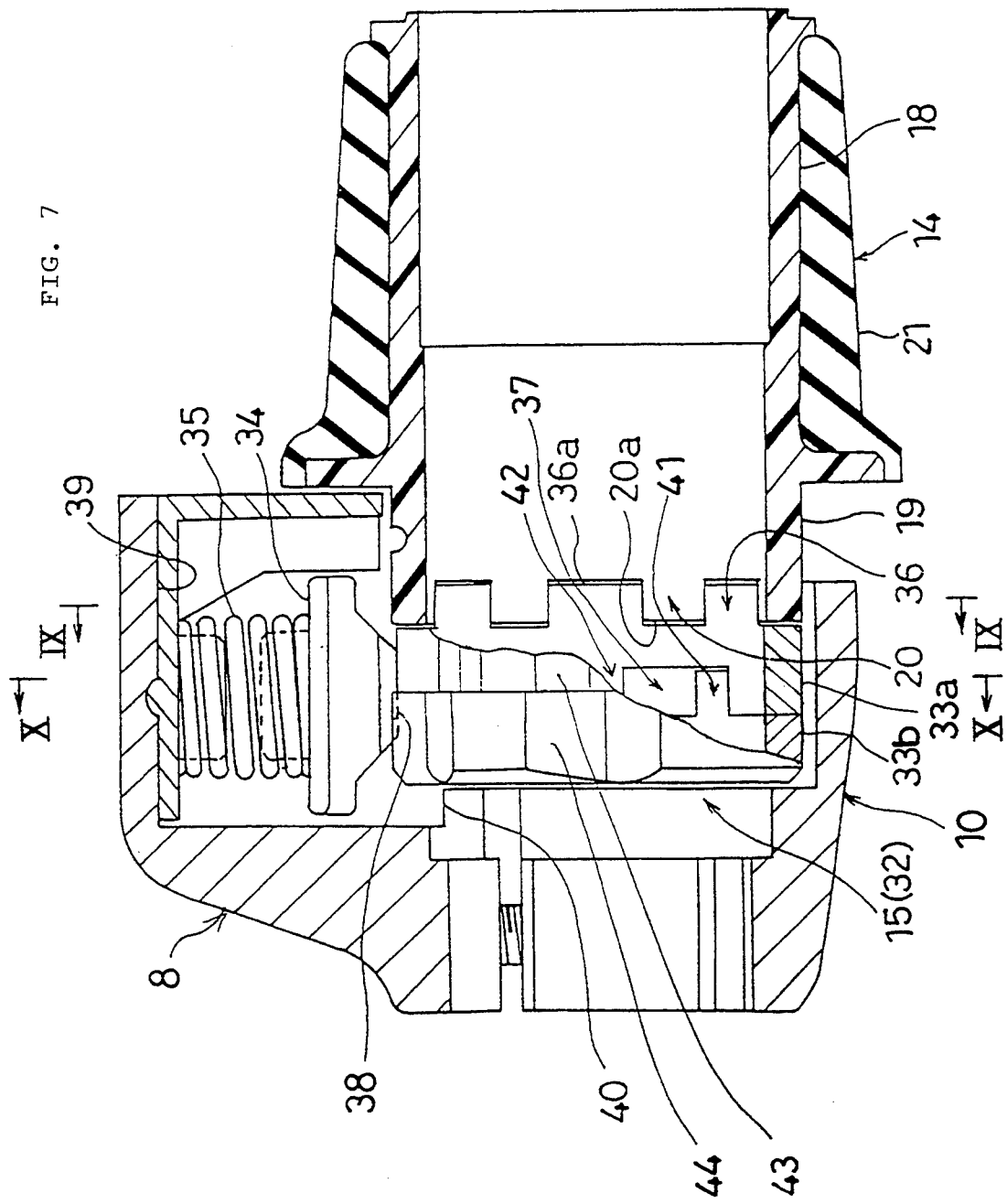
FIG. 7 is a cross-sectional view taken along the line VII—VII of FIG. 4.

The cylindrical operation member 14 generally includes an operating grip portion 18, a drive reel portion 19, and a connecting portion 20, being rotatably inserted around the sleeve member 17 fixed around the grip portion 4b of the handlebar 3. The drive reel portion 19 is formed integrally with the operating grip portion 18 and inward laterally of a bicycle for winding or paying out a drive cable K relative to the cable winding reel 16. As shown in FIG. 7, the connecting portion 20 is provided by forming engaging teeth 20a at an inward end of the cylindrical operation member 14 for engagement with another connecting portion 36 of the stepwise retaining mechanism 15 so as not to rotate relatively each other, thereby rotationally driving the stepwise retaining mechanism 15.

For easy gripping by a rider, the operating grip portion 18 has around its circumference a rubber coating 21 formed continuously with the handle grip 5. The rider can, therefore, grip and rotate the cylindrical operating member 14 in the same manner as gripping the handle grip 5. Thus, it is possible to perform a speed change operation while performing handlebar operation.

Figure 5:
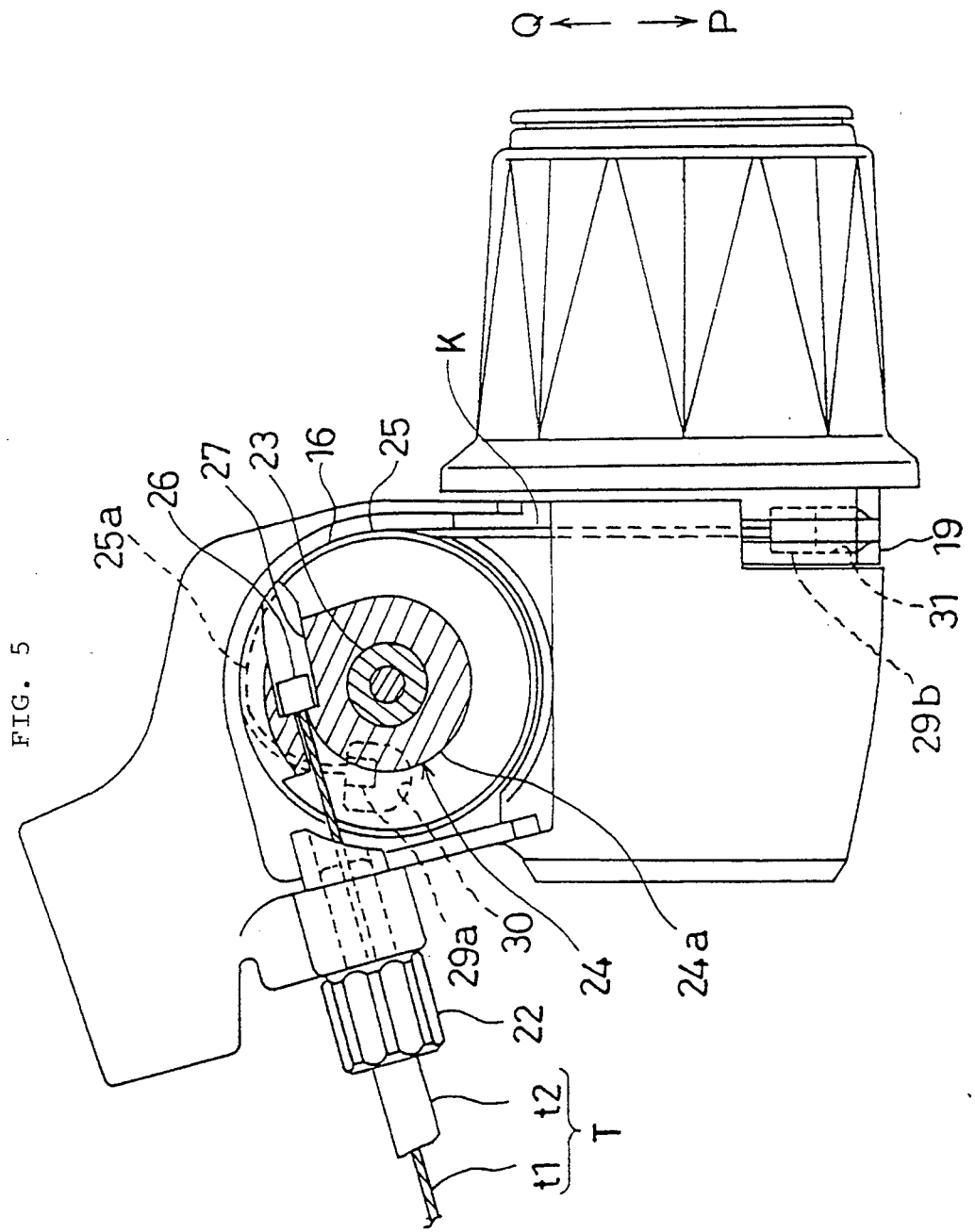
FIG. 5 is a partial cross-sectional view showing a principal portion of the speed change operation assembly according to the present invention.

A speed control cable T according to the present embodiment comprises, as shown in FIG. 5, an inner wire t1 and an outer sheath t2 inserted around it. The outer sheath t2 is fixed to an catcher bolt 22 screwed inside an base end portion of the brake bracket 8. On the other hand, the inner wire t1 is wound around the cable winding reel 16 provided on a base end top surface of the brake bracket 8.

Figure 4:
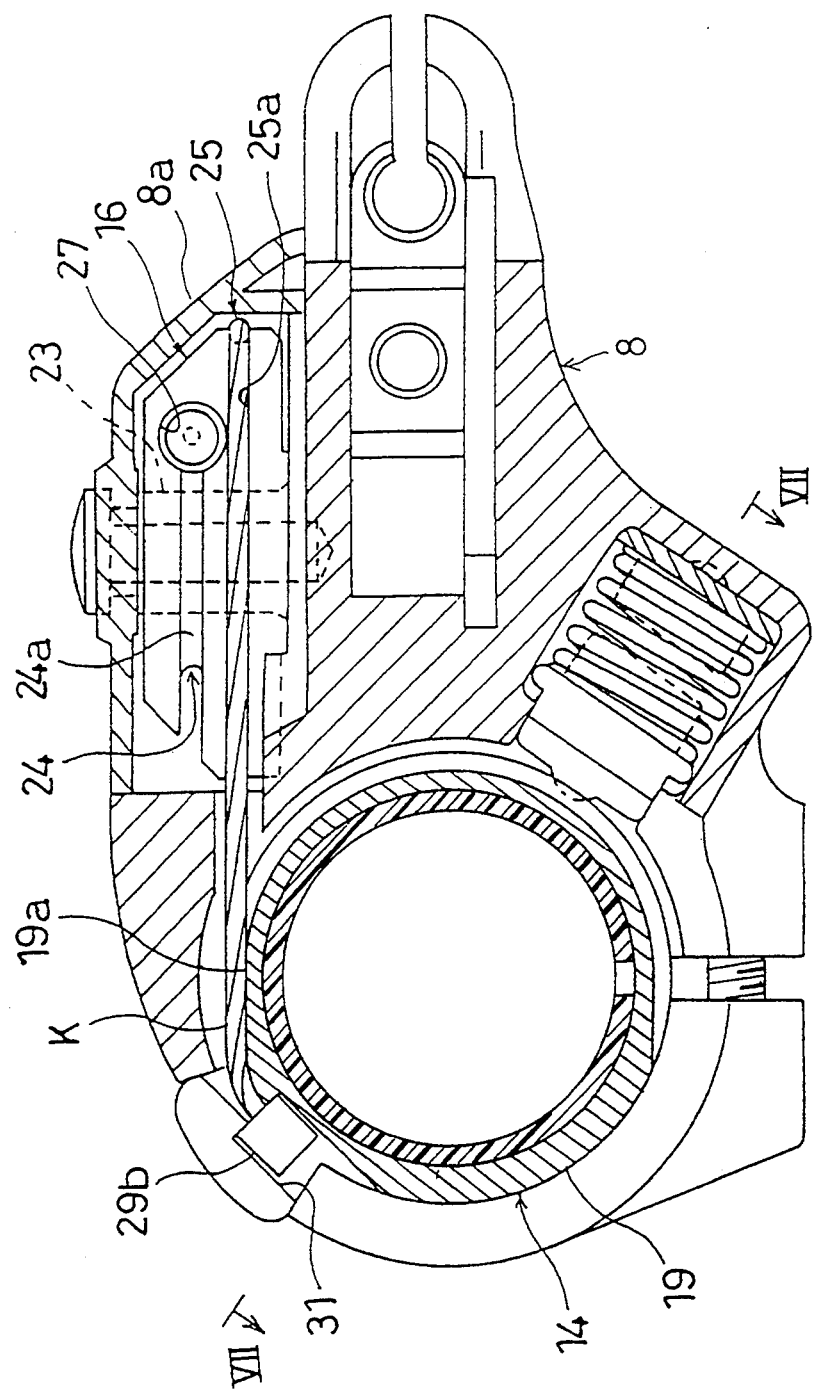
FIG. 4 is a cross-sectional view taken along the line IV—IV of FIG. 3.

As shown in FIGS. 4 and 5, the cable winding reel 16 generally is formed in a shape of a corn frustum rotatably supported around a shaft 23 provided on a top surface of the brake bracket 8. In addition, a cover 8a for enclosing the cable winding reel 16 is provided.

The cable winding reel 16 has on its outer circumference a first reel portion 24 for winding the inner wire t1 of the speed control cable T, and a second reel portion 25 for winding the drive cable K extended from the drive reel portion 19.

The first reel portion 24 is provided on a diametrically smaller side of the cable winding reel 16. The first reel portion 24 has a cable winding groove 24a formed by circumferentially cutting into a slope of the corn frustum, and a nipple catcher hole 27 formed continuously along a tangent of the cable winding groove 24a. The inner wire t1 is wound around the cable winding groove 24a, with a nipple 26 fixed in the nipple catcher hole 27.

The second reel portion 25 is provided on a diametrically larger side of the corn frustum. A cable winding groove 25a is formed along a largest outer diameter of the cable winding reel 16. An end portion of the cable winding groove 25a is curved inward radially. At an end of the cable winding groove 25a, a nipple catcher hole 30 is continuously formed. The drive cable K is wound around the cable winding groove 25a, and by fixing a nipple 29a provided at an end of the drive cable to the nipple catcher hole 30, the end of the drive cable K is connected to the cable winding reel 16.

A nipple 29b provided at the other end portion of the drive cable K is housed in a nipple catcher hole 31 provided along the reel winding groove 19a of the drive reel portion 19, thereby fixing the other end of the drive cable K to the cylindrical operating member 14.

With the arrangement described hereinabove, the speed change control cable T and the drive cable K are wound or paid out generally perpendicularly to each other. Thus, by winding the drive cable K circumferentially about the cylindrical operation member 14, it is possible to wind the inner wire t1 in a direction along the handlebar 3.

As shown in FIGS. 4 and 5, in the present embodiment, the drive cable K is pulled, and wound around the drive reel portion 19 when the cylindrical operation member 14 is rotatably operated so that a top face thereof is moved rearward (Arrow P). This causes the cable winding reel 16 to rotate clockwise in FIG. 5. This rotational movement of the cable winding reel 16 causes the inner wire t1 of the speed control cable T to be wound.

On the other hand, when the cylindrical operation member 14 is rotated so that a top surface thereof is moved forward (Arrow Q), the drive cable K is paid out from the reel portion 19. An unillustrated return spring provided on a speed shifter side rotates the cable winding reel 16 counterclockwise, causing the inner wire t1 to be paid out from the first reel portion 24 of the cable winding reel 16.

This winding or paying out operation of the inner wire t1 generates axial relative movement between the inner wire t1 and the outer sheath t2 of the speed control cable for activating the front speed shifter 1b.

Figure 6:
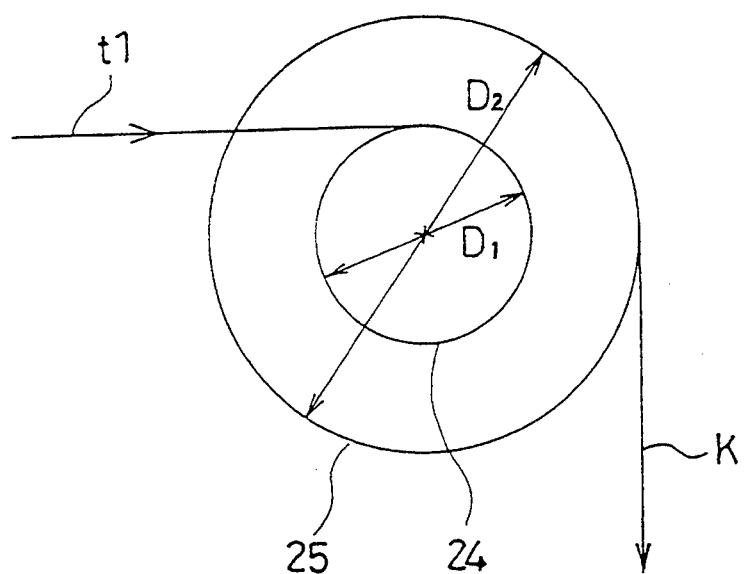
FIG. 6 is a view for describing function of the speed change operation assembly according to the present invention.

In the present embodiment, as shown in FIG. 6, a cable winding diameter $D_1$ of the first reel portion 24 is made smaller than a cable winding diameter $D_2$ of the second reel portion 25. Therefore, it is possible to amplify a pulling force of the drive cable K wound around the second reel portion 25 for pulling the inner wire t1 wound around the first reel portion 24.

As shown in FIG. 3, the stepwise retaining mechanism 15 is provided in an inner circumference of the cylindrical mount 10. The stepwise retaining mechanism 15 employs a click mechanism 32 having a click ring as a retaining member, and is arranged for a bicycle front gear having three sprockets.

The click mechanism 32 mainly includes a first click ring 33a as a retaining member, a second click ring 33b as a regulating member, an engaging member 34, and a coil spring 35.

Figure 8:
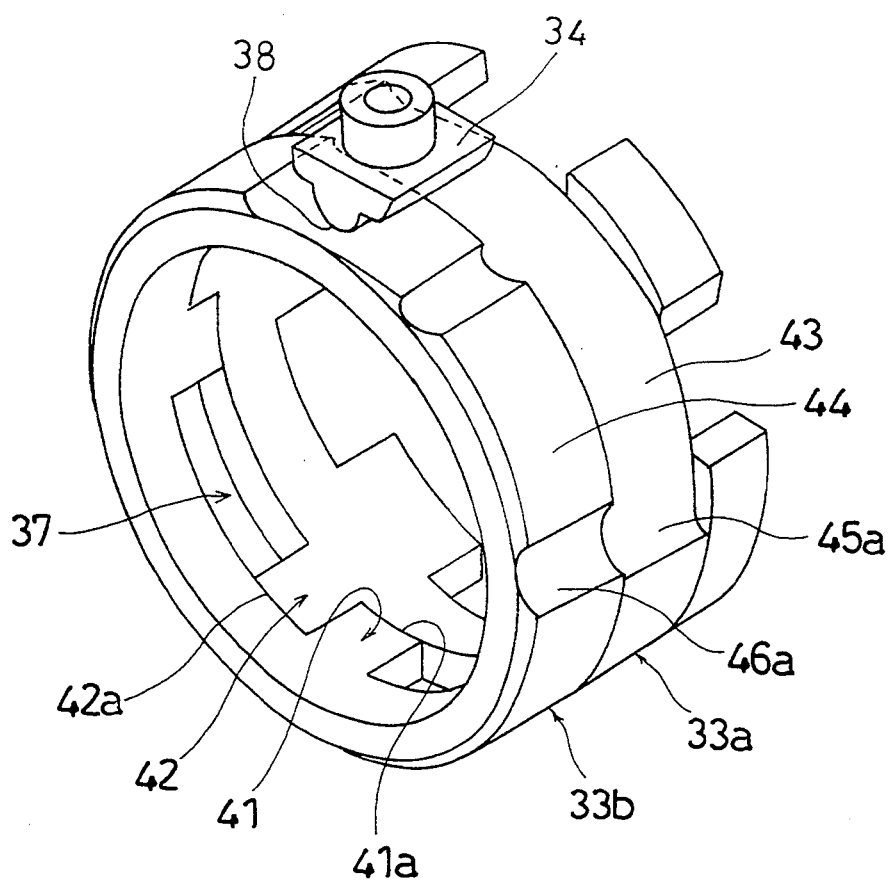
FIG. 8 is a perspective view showing a state of engagement of a retaining member with an engaging member.

As shown in FIG. 8, the first click ring 33a and the second click ring 33b are each formed in a generally cylindrical shape, being rotatably inserted around the sleeve member 17 within an annular space provided inside the cylindrical mount 10.

Figure 9:
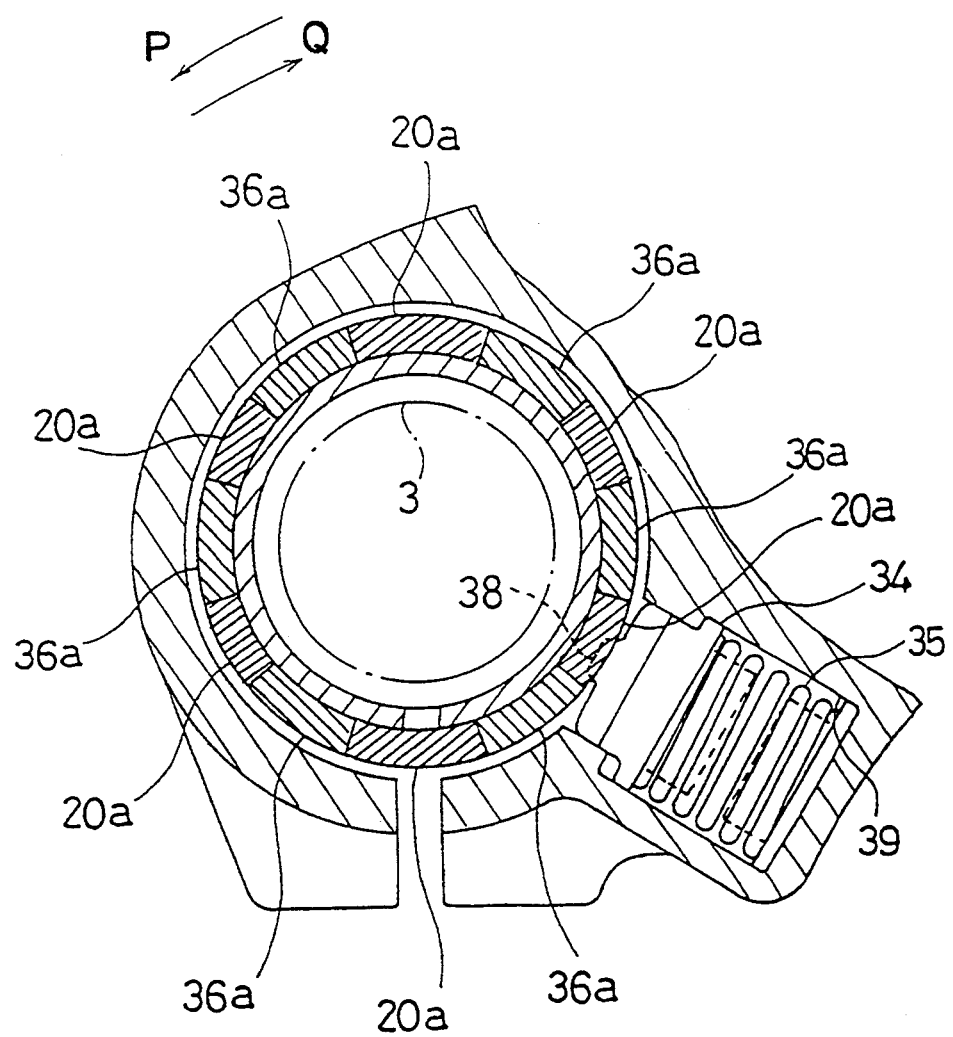
FIG. 9 is a cross-sectional view taken on the line IX—IX of FIG. 7.

The first click ring 33a is provided, at its end face outward laterally of the bicycle, with the connecting portion 36 to be connected with another connecting portion 20 formed at an inward end face of the cylindrical operation member 14. As illustrated in FIGS. 7 and 9, a plurality of engaging teeth 36a formed on the connecting portion 36 engages with a plurality of engaging teeth 20a formed in the connecting portion 20 so that the first click ring 33a rotates integrally with the cylindrical operation member 14. This first click ring 33a functions as the retaining member.

As illustrated in FIGS. 7 and 8, the first click ring 33a is provided, at its end face inward laterally of the bicycle, with a connecting portion 42 to be connected with another connecting portion 41 formed at an outward end face of the second click ring 33b.

The connecting portion 42 of the first click ring 33a and the connecting portion 41 formed on the outward end face of the second click ring 33b are respectively provided with engaging teeth 41a, 41b for mutual engagement. These engaging teeth 41a, 42a are formed so that there is a predetermined circumferential gap 37 when they are mutually engaged. This permits the second click ring 33b with a predetermined rotational play relative to the first click ring 33a. A circumferential length of the gap 37, which is the play for the second click ring 33b, is set to correspond to an amount of overshifting operation of the cylindrical operation member 14.

As shown in FIGS. 7 and 8, the two click rings 33a, 33b are respectively formed on their outer circumferences with a first cam face 43 and a second cam face 44.

The first and second cam faces 43, 44 are respectively formed with a plurality of axially extended engaging portions 45a, 45b . . . , and 46a, 46b . . . . The engaging portions 45a, 45b . . . , and 46a, 46b . . . are each formed by making an engaging recess or an engaging projection on respective cam surfaces 43, 44. A pawl 38 of the engaging member 34 is engaged with an engaging portion formed on one of the cam faces, or with an engaging portion formed on each of the cam faces in a bridge-like manner.

The engaging member 34 is elastically contacted to the cam faces 43, 44 respectively of the click rings 33a, 33b by the coil spring 35. A successive engagement of the pawl 38 with the engaging portions 45a . . . , 46a . . . causes the cylindrical operation member 14 to be held stepwise at predetermined rotational positions.

As shown in FIG. 7, the engaging member 34 is housed with the coil spring 35 in a housing bore 39 provided at a base end portion of the brake bracket 8. The housing bore 39 has an opening 40 communicating with the inner circumference of the cylindrical mount 10. The pawl 38 of the engaging member 34 is projected from the opening 40, being contacted to the cam faces 43, 44 of the click rings 33a, 33b.

When the cylindrical operation member 14 is operated to rotate the click rings 33a, 33b, the pawl 38 of the engaging member 34 is brought to successive engagement with the engaging portions 45a . . . , 46a . . . of the first and second cam faces 43 and 44, causing the click rings 33a, 33b, or the cylindrical operation member 14, to be held stepwise at predetermined rotational positions.

Function of the click mechanism 32 arranged as hereinabove will now be elaborately described in the following paragraphs:

FIGS. 10 through 17 show a first embodiment of the click mechanism according to the present invention. These views are cross-sectional views each taken on Line X—X of FIG. 7. The arc A shown in each view generally represents the amount of the inner wire t1 wound during a process of a speed change operation.

Figure 10:
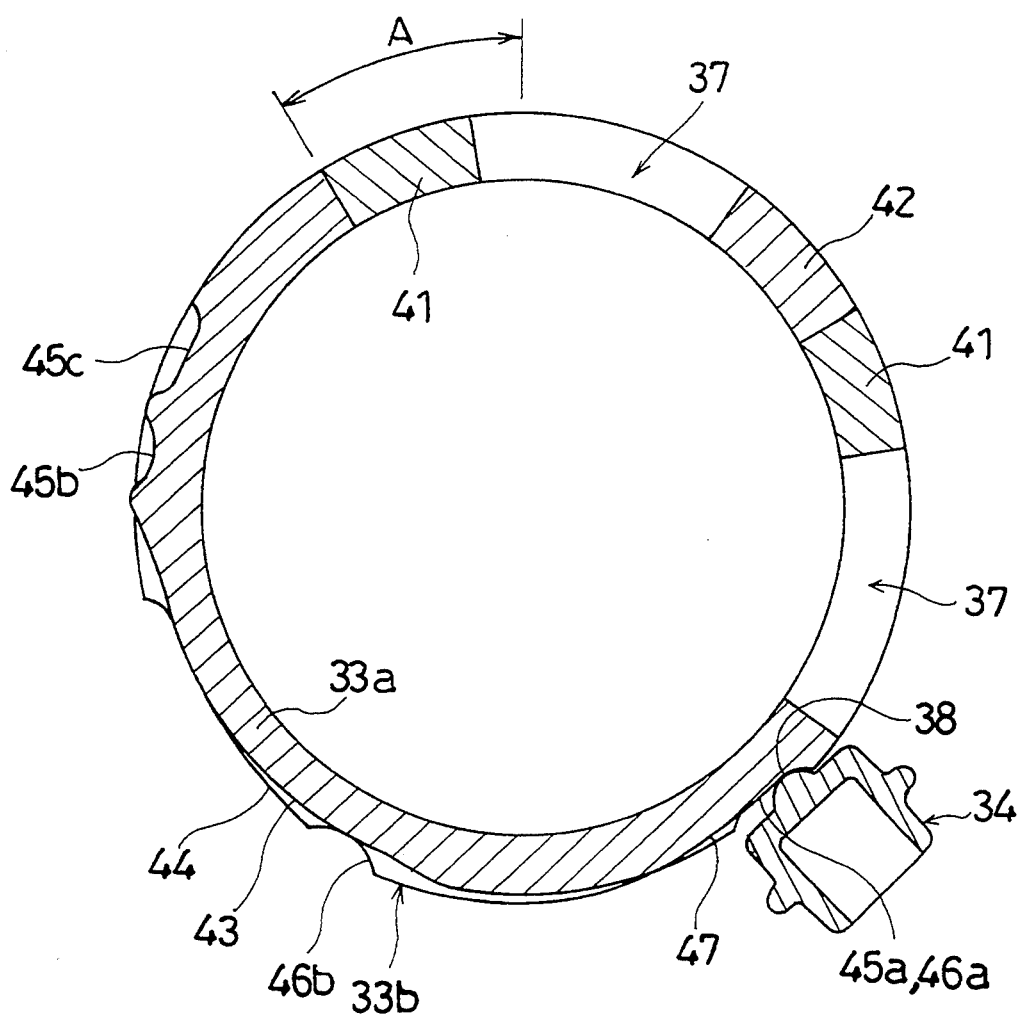
FIG. 10 is a view for describing function of a stepwise retaining mechanism according to a first embodiment.

FIG. 10 shows a state where the inner wire t1 is paid out to its maximum extent, that is, where a chain engages with a diametrically smallest sprocket.

In this situation, the pawl 38 of the engaging member 34 is engaged, in a bridge-like manner, with the engaging portion 45a formed as a groove on the first cam face 43, and the engaging portion 46a formed as a groove on the second cam face 44.

The engaging portion 45a has a stepwise edge in its cable winding direction (Arrow P) for engagement with the pawl 38 so as to prevent the click rings 33a, 33b and the cylindrical operation member 14 from rotating in a cable paying out direction (Arrow Q).

The engaging portion 46a has a stepwise edge in its cable paying out direction (Arrow Q) formed in a similar manner to the edge in the cable winding direction. On the other hand, a cable paying out side of the engaging portion 45a is formed with a tapered portion 47 beginning at a bottom of the engaging portion 45a and gradually increasing in its radial height.

With a situation shown in FIG. 10, when the cylindrical operation member 14 is rotated in the cable winding direction (Arrow P), the first click ring 33a is rotated counterclockwise while the engaging member 34 remains engaged with the engaging portion 46a of the second cam face 44, that is, while the second click ring 33b being stationary.

Figure 11:
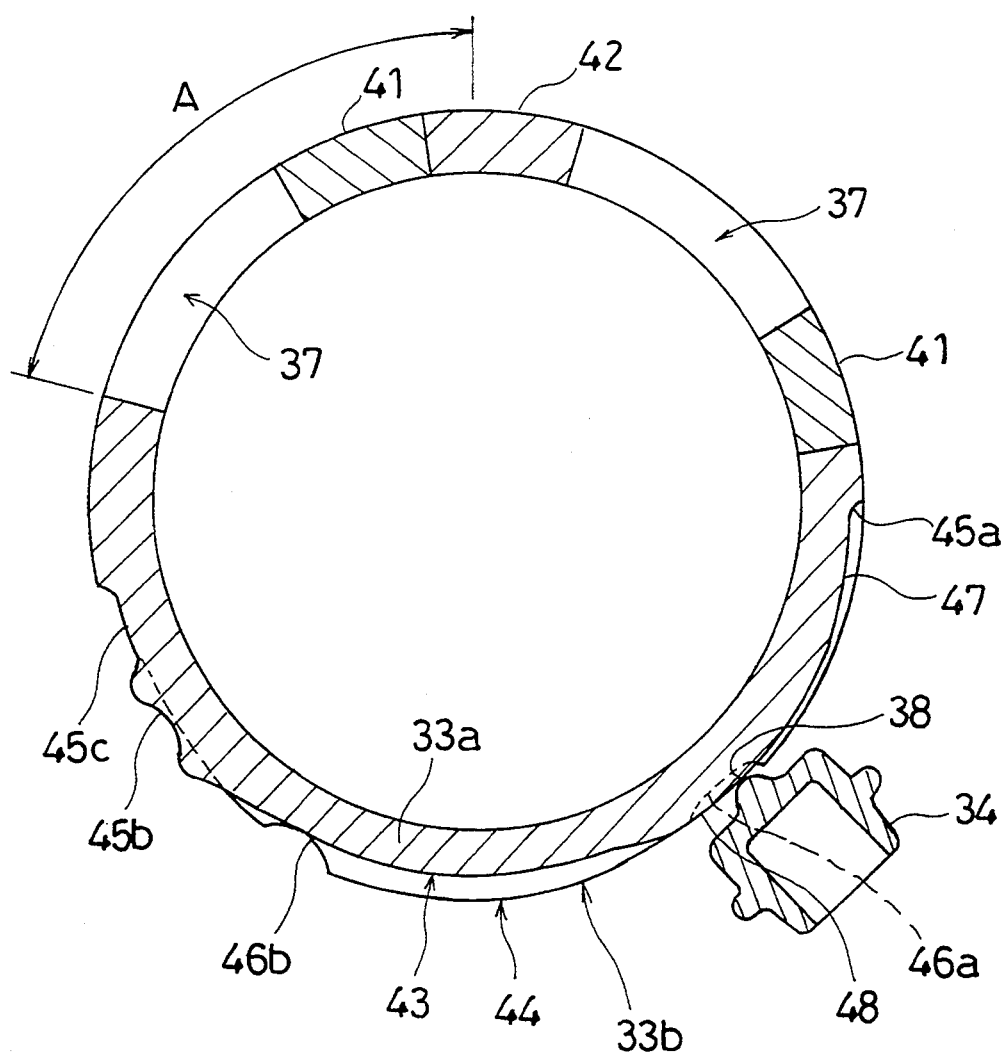
FIG. 11 is a view for describing function of the stepwise retaining mechanism according to the first embodiment.

Now, as shown in FIG. 11, after the engaging teeth 42 of the first click ring 33a has contacted the engaging teeth 41 of the second click ring 33b, the click rings 33a, 33b are rotated integrally with each other in the cable winding direction.

According to the present embodiment, as the first click ring 33a rotates, the tapered portion 47 formed on the first cam face 43 gradually lifts the engaging member 34 radially outward. In addition, on the first cam face 43, the tapered portion 47 is followed by an engagement prevention region 48 for preventing the engaging member 34 from engaging with the engaging portion 46a when the second click ring 33b comes to its rotational end in cable paying out direction relative to the first click ring 33a. Thus, as shown in FIG. 11, when the second click ring 33b comes to the end of the play relative to the first click ring 33a, the engaging member 34 is completely lifted, and thus disengaged, from the engaging portion 46a.

Since the engagement prevention region 48 is formed continuously with the tapered portion 47, when the second click ring 33b begins rotating integrally with the first click ring 33a, the engaging pawl 38 is lifted from the engaging portion 46a, eliminating resistance for the engaging pawl 38 to disengage from the engaging portion 46a. As a result, it is possible to perform a significantly smooth speed change operation.

Figure 12:
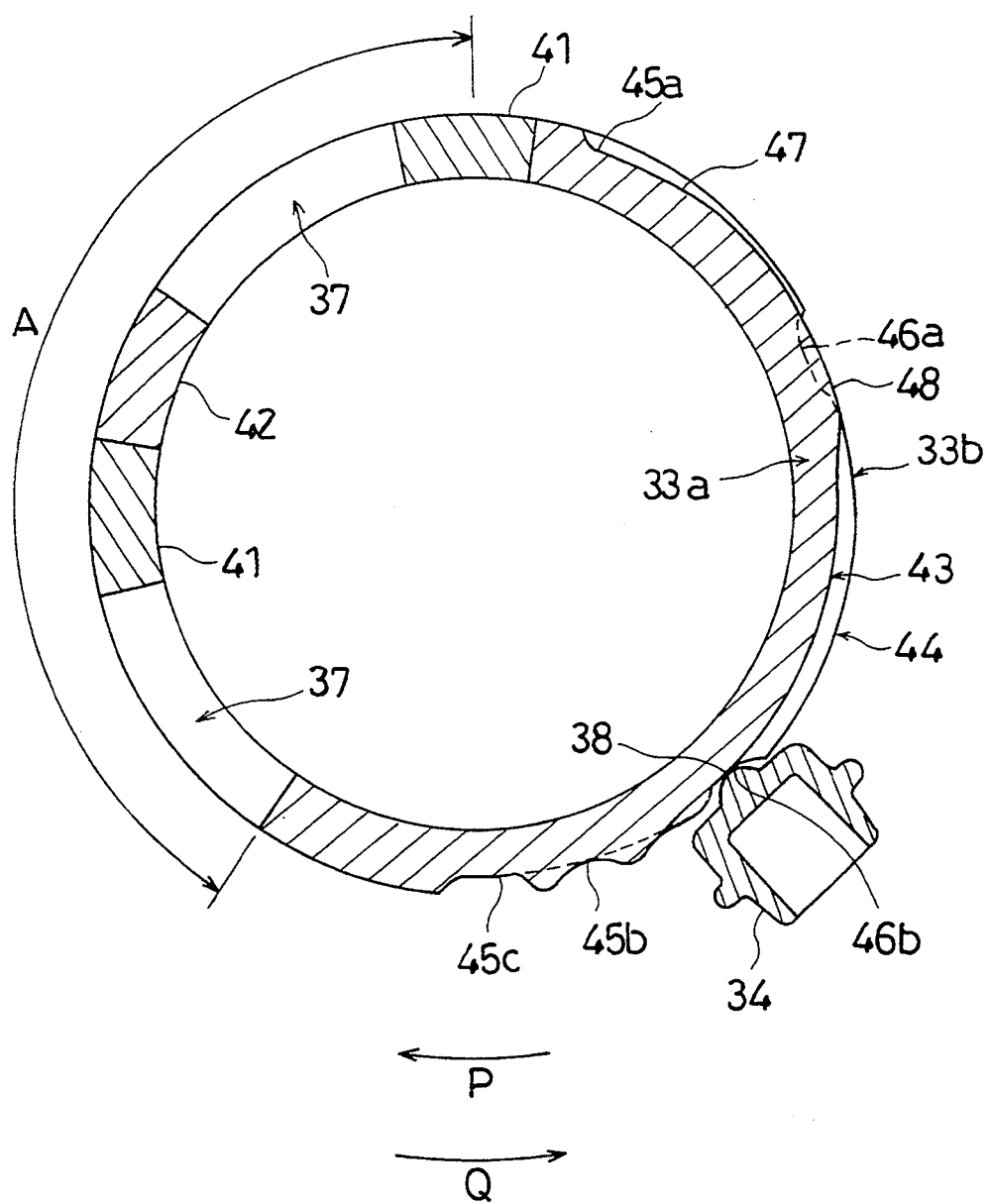
FIG. 12 is a view for describing function of the stepwise retaining mechanism according to the first embodiment.

Next, when the cylindrical operation member 14 is rotated from the state shown in FIG. 11 further in the cable winding direction, the first and second click rings 33a, 33b is rotated integrally with each other, and as shown in FIG. 12, the engaging member 34 is engaged with the engaging portion 46b formed on the second cam face 44, generating a clicking sound. The engaging portion 46b has its circumferential edges formed stepwise, so that the engagement with the engaging member 34 from either direction generates a clicking sound.

In the state shown in FIG. 11, the first cam face 43 is not formed with an engaging portion. Thus, when the cylindrical operation member 14 is relieved of the rotational operating force, the return spring provided in the speed shifter causes the cylindrical operation member 14 to return in the cable paying out direction (Arrow Q). This also causes the first click ring 33a to return in the cable paying out direction.

Figure 13:
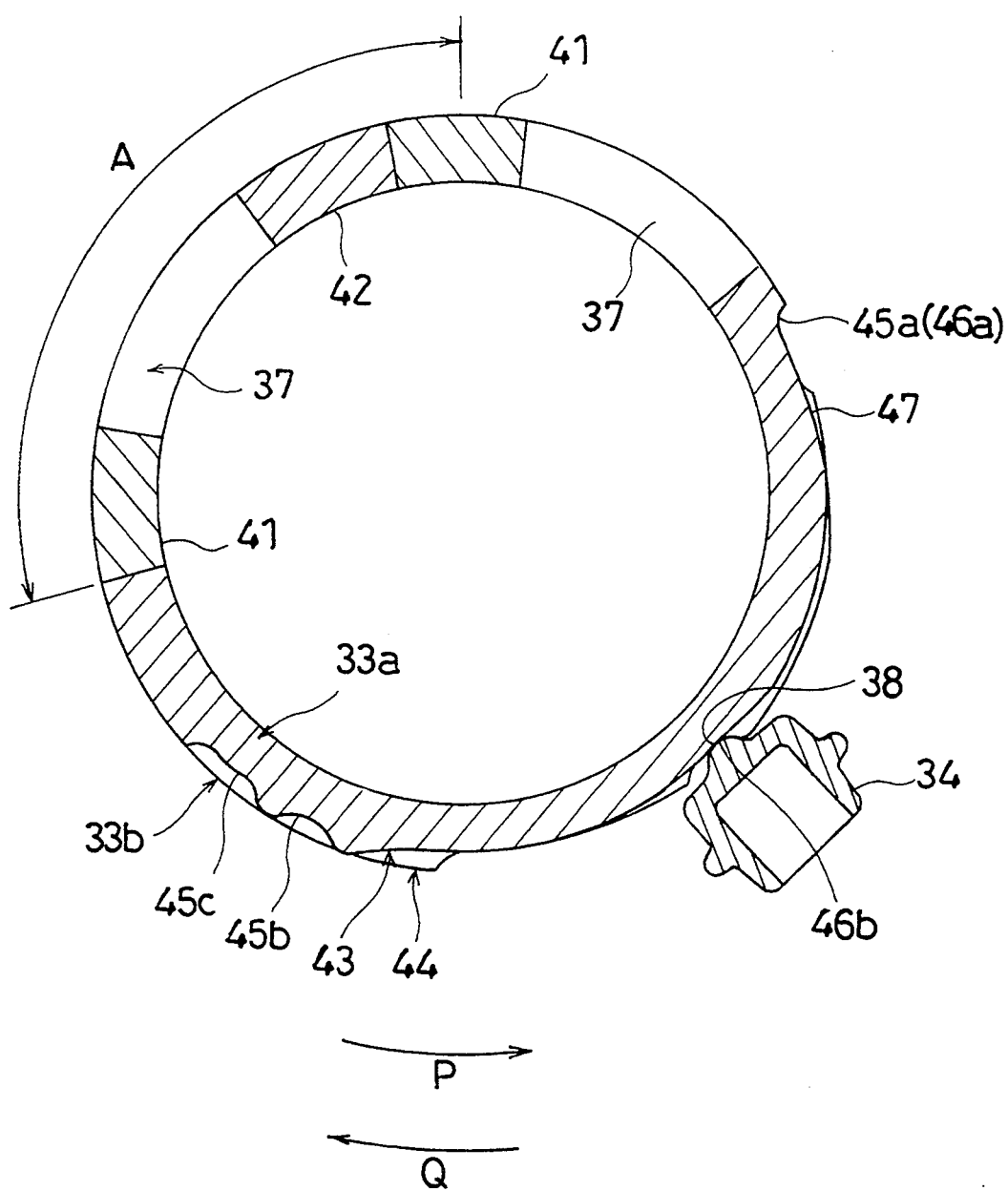
FIG. 13 is a view for describing function of the stepwise retaining mechanism according to the first embodiment.

Then, as shown in FIG. 13, when the engaging teeth 41 of the first click ring 33a contact the engaging teeth 42 of the second click ring 33b, the above returning rotation is prevented, and the first click ring 33a and the cylindrical operation member 14 are held at a predetermined rotational position corresponding to a diametrically intermediate sprocket.

In the present embodiment, the play for the second click ring 33b relative to the first click ring 33a is set to correspond to the amount of overshifting operation of the cylindrical operation member 14. For this reason, the engaging portion 46b engages with the engaging member 34 when the cylindrical operation member 14 is rotated in the cable winding direction to the overshift position, and the clicking sound is generated at the overshift position. When a rider hears the clicking sound and removes the operating force applied to the cylindrical operation member 14, the cylindrical operation member 14 and the first click ring 33a are returned in the cable paying out direction while the second click ring 33b is prevented by the engaging member 34 from rotating. The first click ring 33a and the cylindrical operation member 14 are then held at the rotational position corresponding to the diametrically intermediate sprocket by means of the second click ring 33b.

Hence, the rider can perform an overshifting operation by rotating the cylindrical operation member 14 until the clicking sound is heard. Then, when the rider removes his rotational operating force to the clicking sound, it is possible to automatically return the cylindrical operation member 14 to its true rotational position which corresponds to the diametrically intermediate sprocket. Therefore, it is possible to assuredly perform an overshifting operation, resulting in significant improvement in speed change operability.

Figure 14:
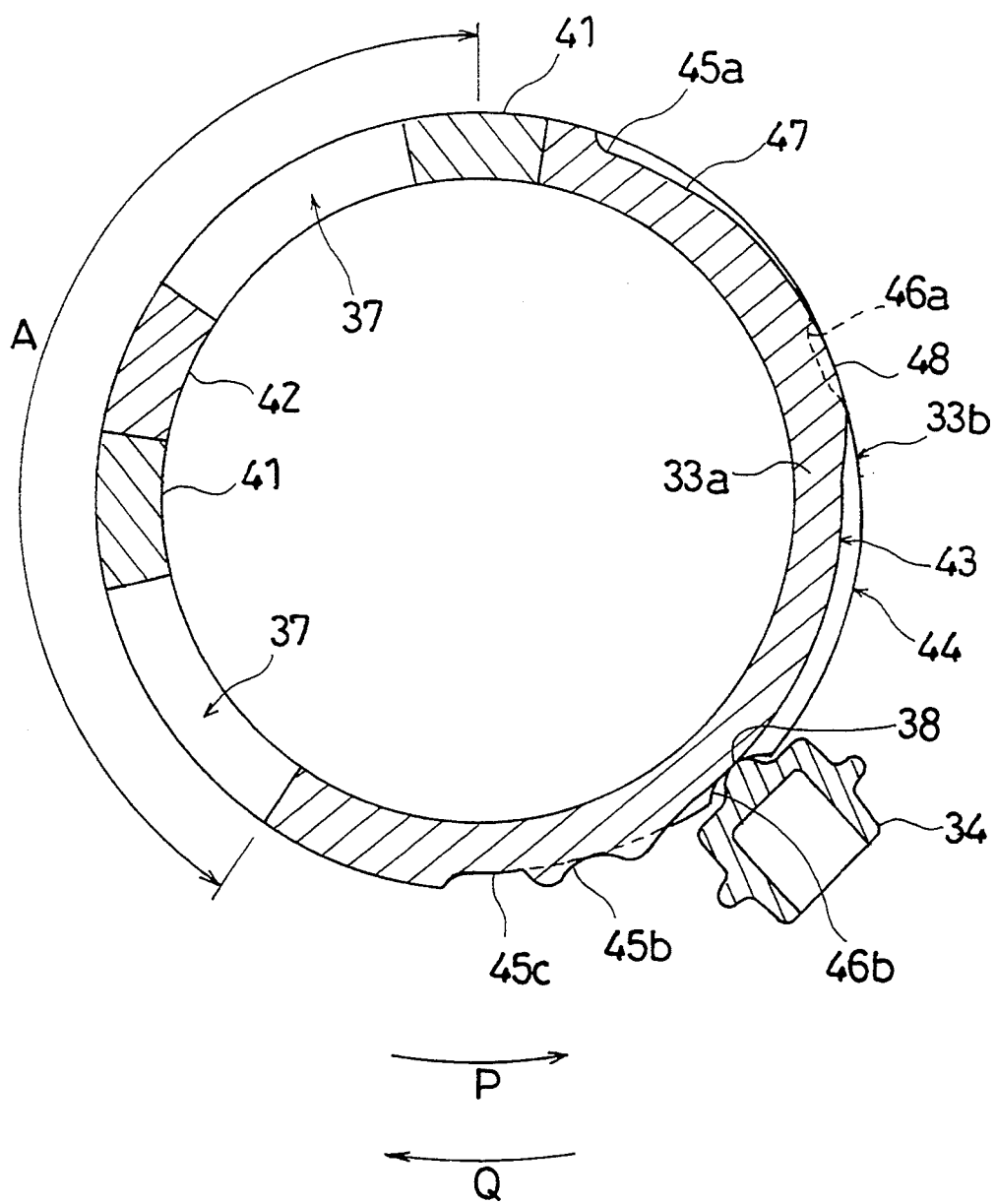
FIG. 14 is a view for describing function of the stepwise retaining mechanism according to the first embodiment.
Figure 15:
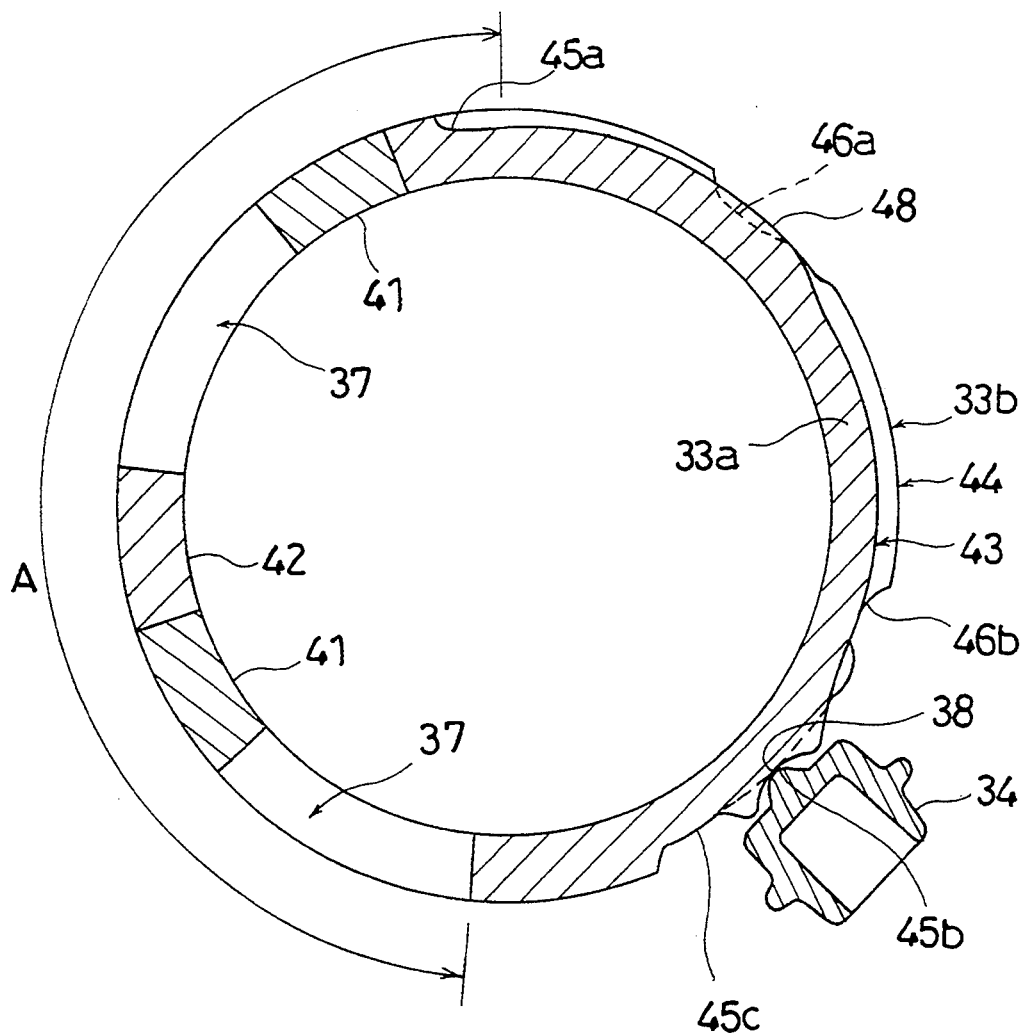
FIG. 15 is a view for describing function of the stepwise retaining mechanism according to the first embodiment.

When the cylindrical operation member 14 is further rotated in the cable winding direction from the state shown in FIG. 13, the cylindrical operation member passes the overshift position shown in FIG. 14 to another rotational position which corresponds to the diametrically largest sprocket shown in FIG. 15. Then, the engaging member 34 is engaged with the engaging portion 45b, holding the cylindrical operation member 14 at the rotational position corresponding to the diametrically largest sprocket, that is, the rotational position where A, or the amount of cable winding, reaches its maximum.

The first click ring 33a is rotated integrally with the cylindrical operation member 14. Thus, when the operational force applied to the cylindrical operation member 14 is removed in the above-described state, the cylindrical operation member 14 or the first click ring 33a is not returned. Therefore, an overshifting does not occur when the cylindrical operation member 14 is rotated to the rotational position corresponding to the diametrically largest sprocket unlike in a conventional click mechanism where overshifting occurs at every speed position. Further, the problem of the chain disengaging from the diametrically largest sprocket is eliminated even if an appropriate overshift is provided for the case where the chain shifts from the diametrically smallest sprocket to the diametrically intermediate sprocket.

According to the present embodiment, two engaging portions 45b, 45c each for correspondence to the diametrically largest sprocket are provided. This is for a bicycle rider to be able to make adjustment easily by finely rotating the cylindrical operation member 14 when the speed control cable T or the drive cable K becomes enlongated by tension causing indexiation out of adjustment.

Now, description will be made sequentially for function of the speed change operation assembly when the cylindrical operation member 14 is rotated in the cable paying out direction (Arrow Q) from the state shown in FIG. 15.

Figure 16:
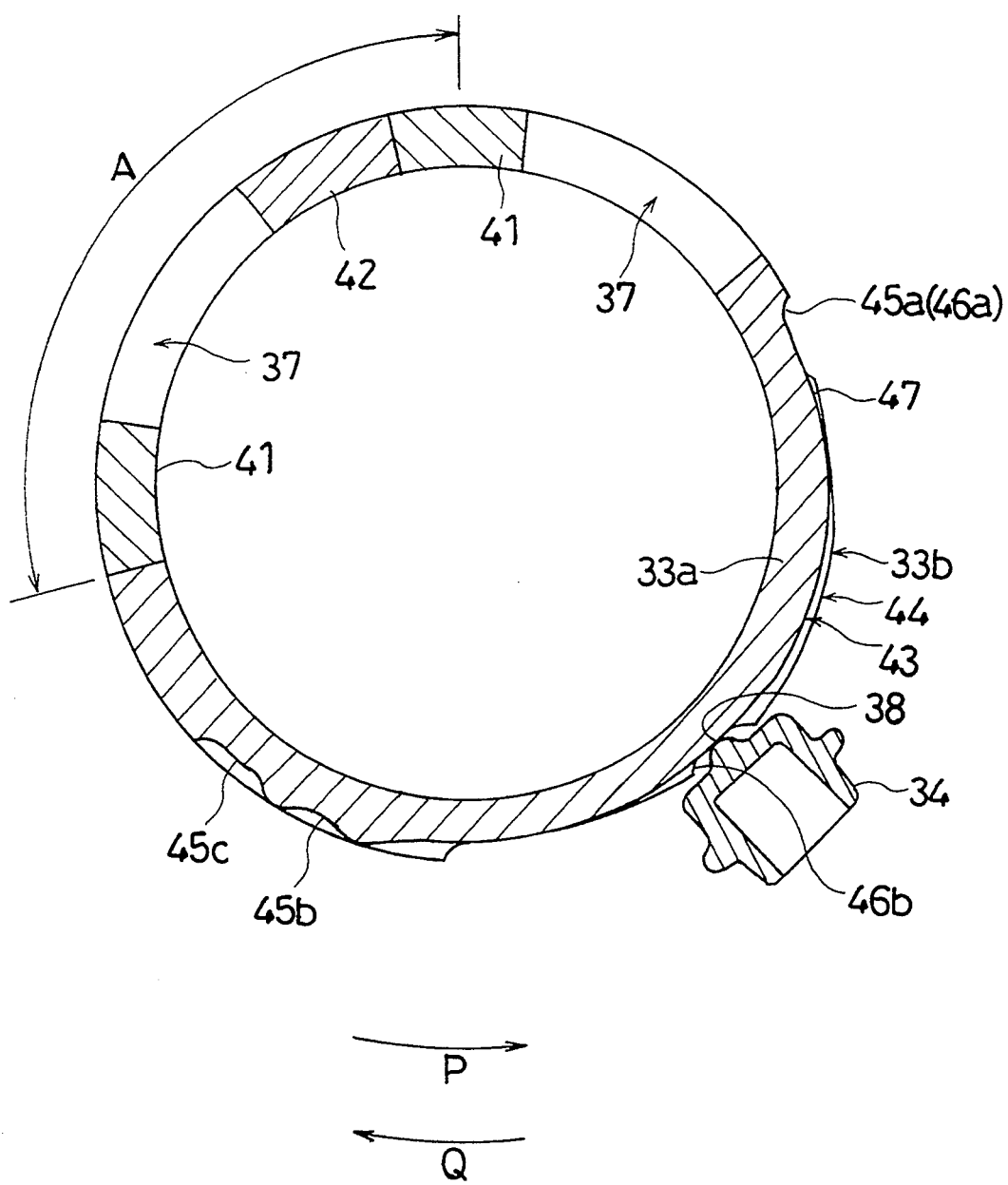
FIG. 16 is a view for describing function of the stepwise retaining mechanism according to the first embodiment.

When the cylindrical operation member 14 is rotated in the cable paying out direction from the state shown in FIG. 15, the first click ring 33a is integrally rotated in the cable paying out direction (Arrow Q). After the engaging teeth 42 of the first click ring 33a has contacted the engaging teeth 41 of the second click ring 33b, the click rings 33a, 33b are rotated integrally with each other. Then, as shown in FIG. 16, the engaging member 34 is engaged with the engaging portion 46b formed on the second cam face 44, thus holding the first click ring 33a and the cylindrical operation member 14 at the rotatioal position corresponding to the intermediate sprocket by means of the second click ring 33b.

When the cylindrical operation member 14 is rotated in the cable paying out direction (Arrow Q), the first click ring 33a is rotated in the cable paying out direction before the second click ring begins rotated. For this reason, the click mechanism does not generate a clicking sound at the overshift position. At the true rotational position, on the other hand, the engaging member 34 engages with the engaging portion 46b, generating a click sound.

Figure 17:
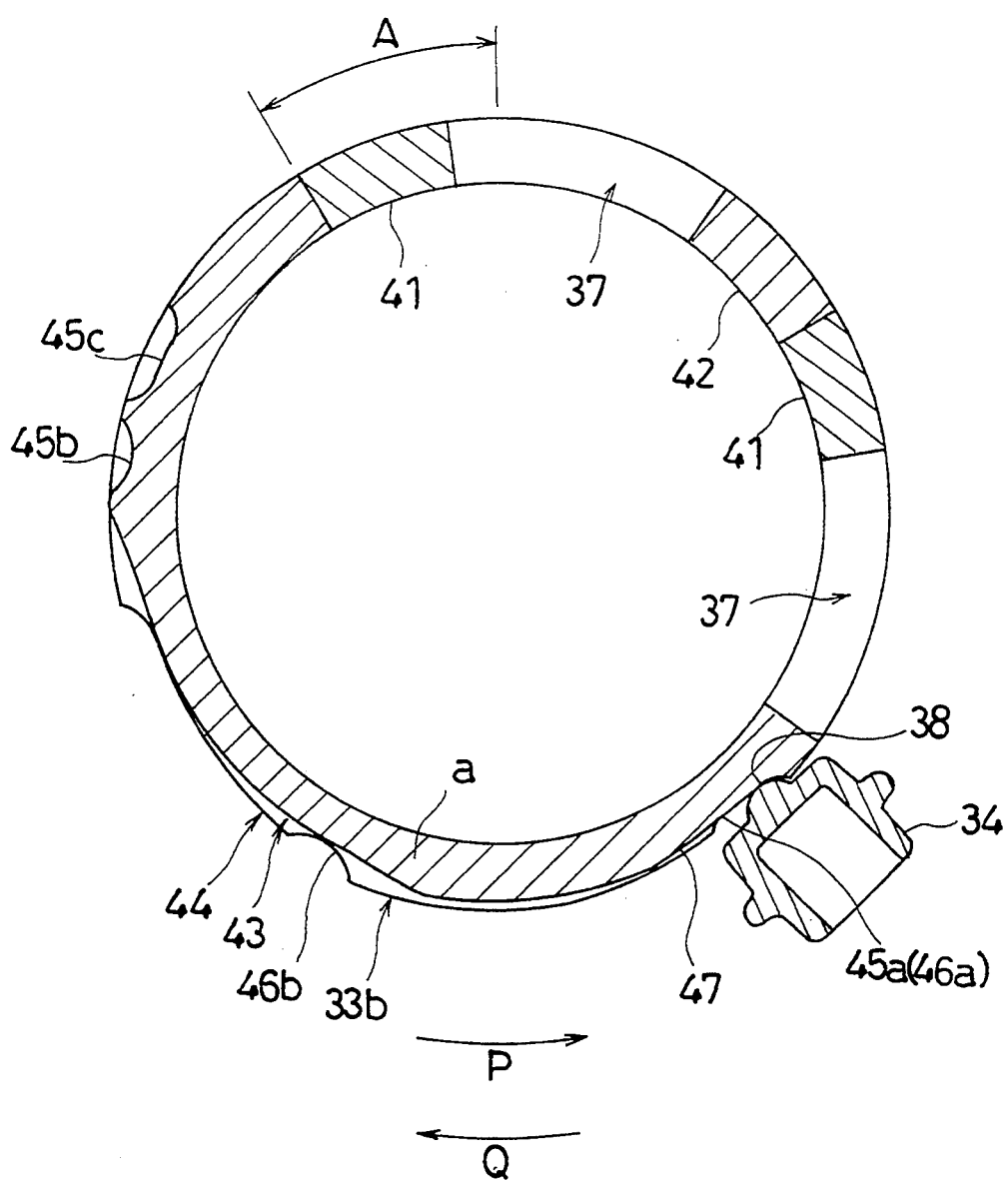
FIG. 17 is a view for describing function of the stepwise retaining mechanism according to the first embodiment.

When the cylindrical operation member 14 is further rotated in the cable paying out direction, the rotational position corresponding to the diametrically smallest sprocket 1, which is the same rotational position with the one shown in FIG. 10, is reached as shown in FIG. 17.

By providing the click rings 33a, 33b arranged as hereinabove, it is possible to perform overshifting only when the chain moves from the diametrically smallest sprocket to the diametrically intermediate sprocket. It is also possible to generate an engaging sound responsive to a speed change operation only when such a sound is necessary. Furthermore, it is possible to reduce rotational resistance of the cylindrical operation member 14, thereby performing a speed change operation smoothly, resulting in remarkable improvement in speed change operability.

FIGS. 18 through 27 show a second embodiment which employs click rings as a retaining member or a regulating member according to the present invention.

Figure 18:
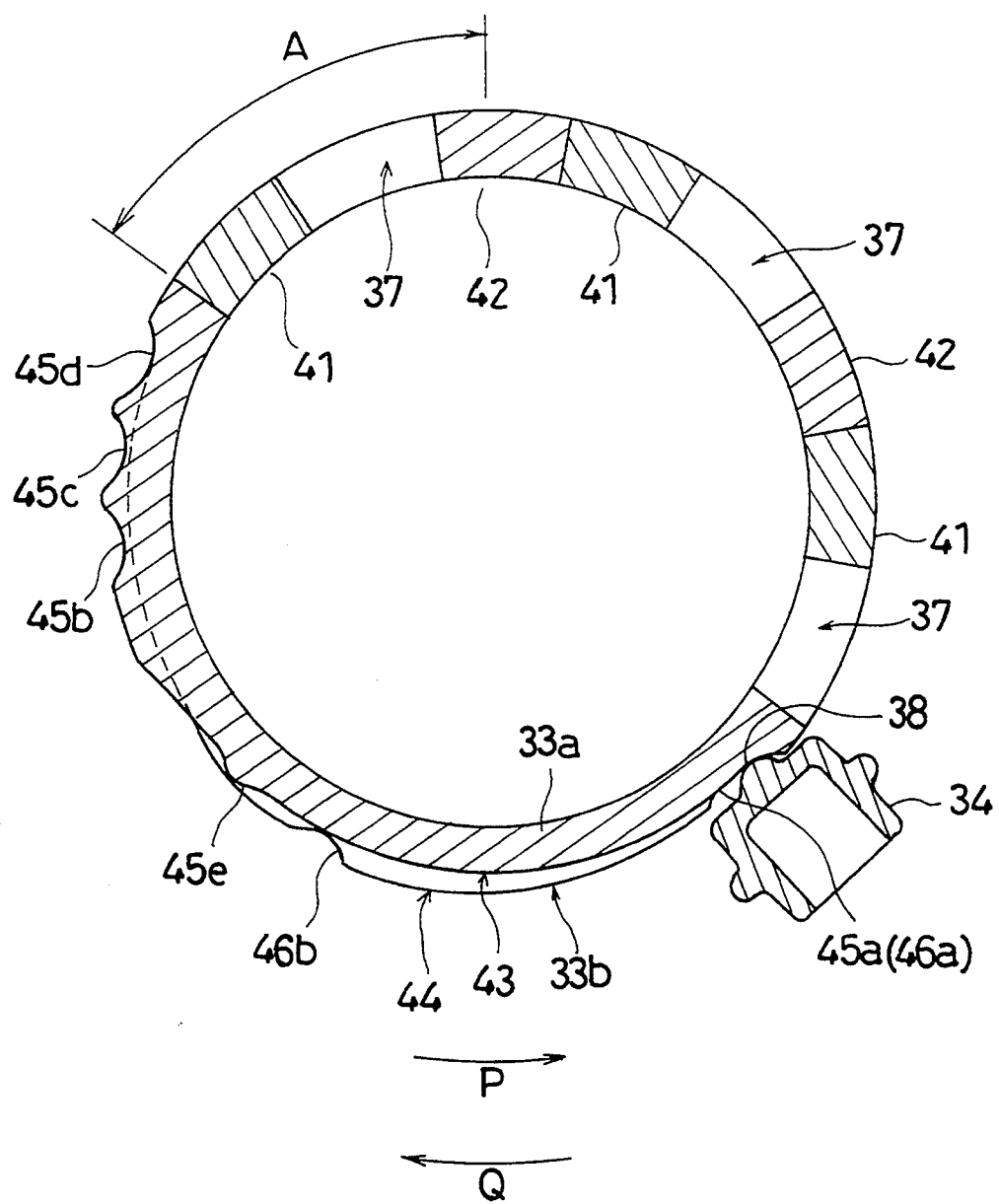
FIG. 18 is a view for describing function of a stepwise retaining mechanism according to a second embodiment.

As shown in FIG. 18, the engaging member 34 is engaged in a bridge-like manner with the engaging portion 45a formed on the first cam face 43 and the engaging portion 46a formed on the second cam face 44, holding the cylindrical operation member 14 at the rotational position corresponding to the diametrically smallest sprocket. From this state, when the cylindrical operation member 14 is rotated in a cable winding direction (Arrow P), the first click ring 33a is rotated integrally, first with the cylindrical operation member, in the same manner as in the first embodiment. After the first click ring 33a has been rotated by its amount of play, the second click ring 33b begins integrally rotated.

It should be appreciated to note here that in this embodiment, a tapered portion or an engagement prevention region as provided in the first embodiment for helping the engaging member 34 disengage from the engaging portion 46a is not provided.

Figure 19:
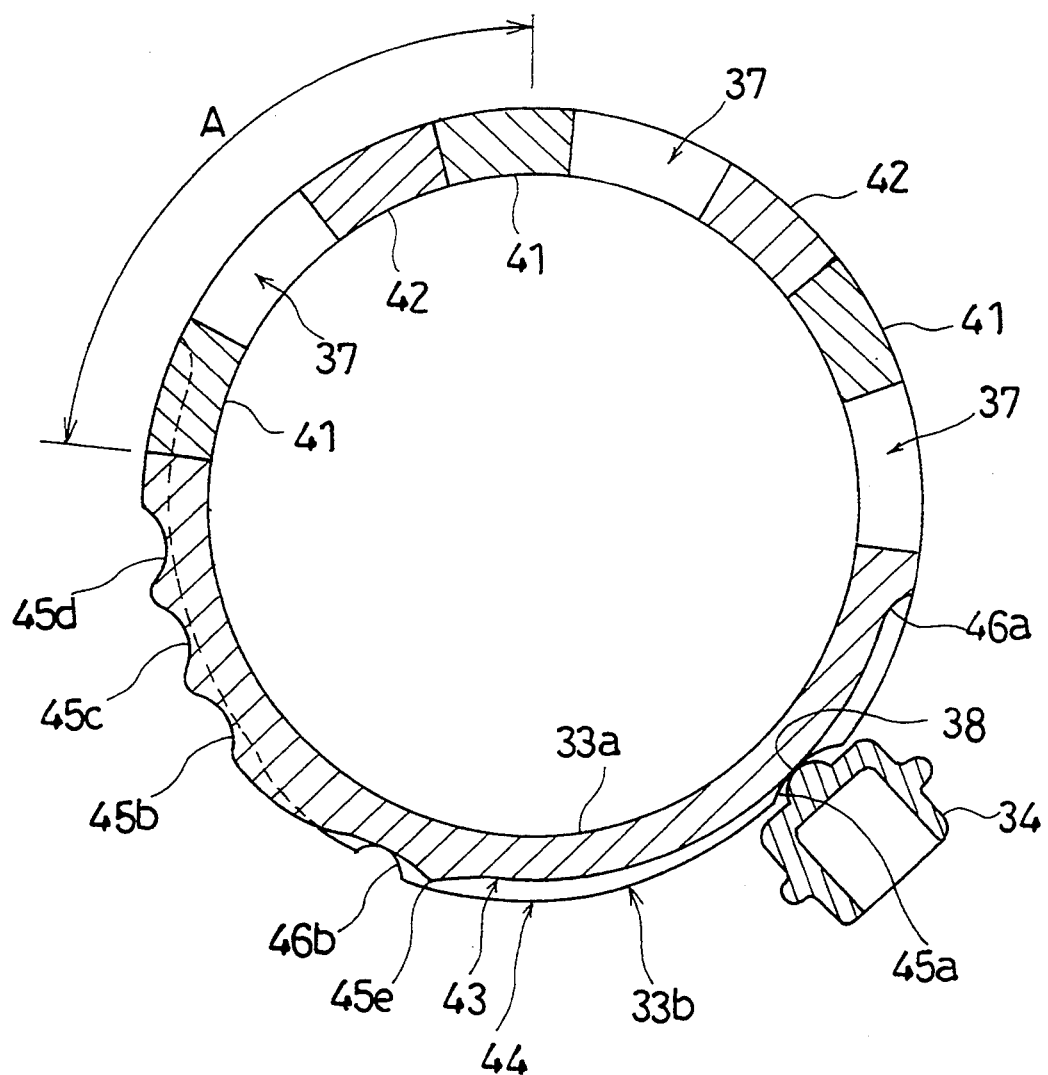
FIG. 19 is a view for describing function of the stepwise retaining mechanism according to the second embodiment.
Figure 20:
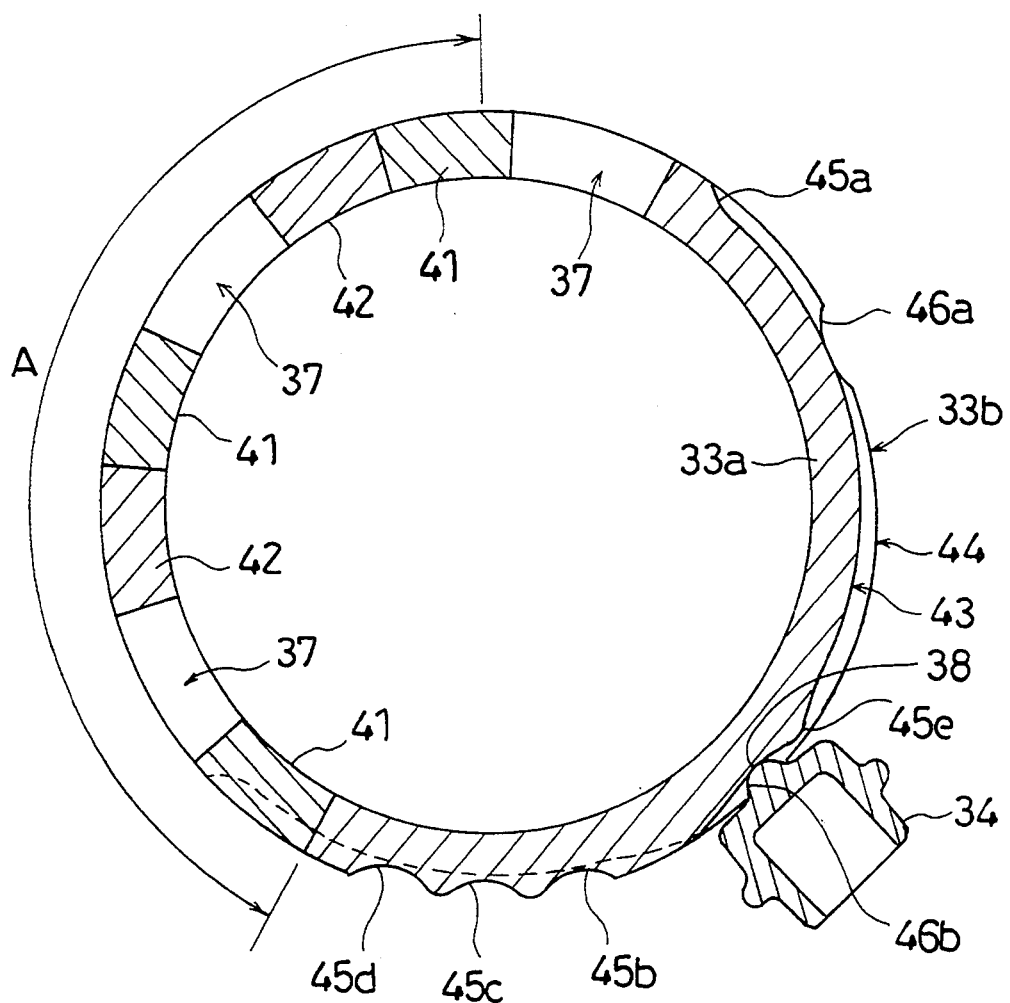
FIG. 20 is a view for describing function of the stepwise retaining mechanism according to the second embodiment.

When the first and second click rings 33a and 33b are rotated from a state shown in FIG. 19 to a sate shown in FIG. 20, the engaging member 34 is engaged with the engaging portion 46b.

Figure 21:
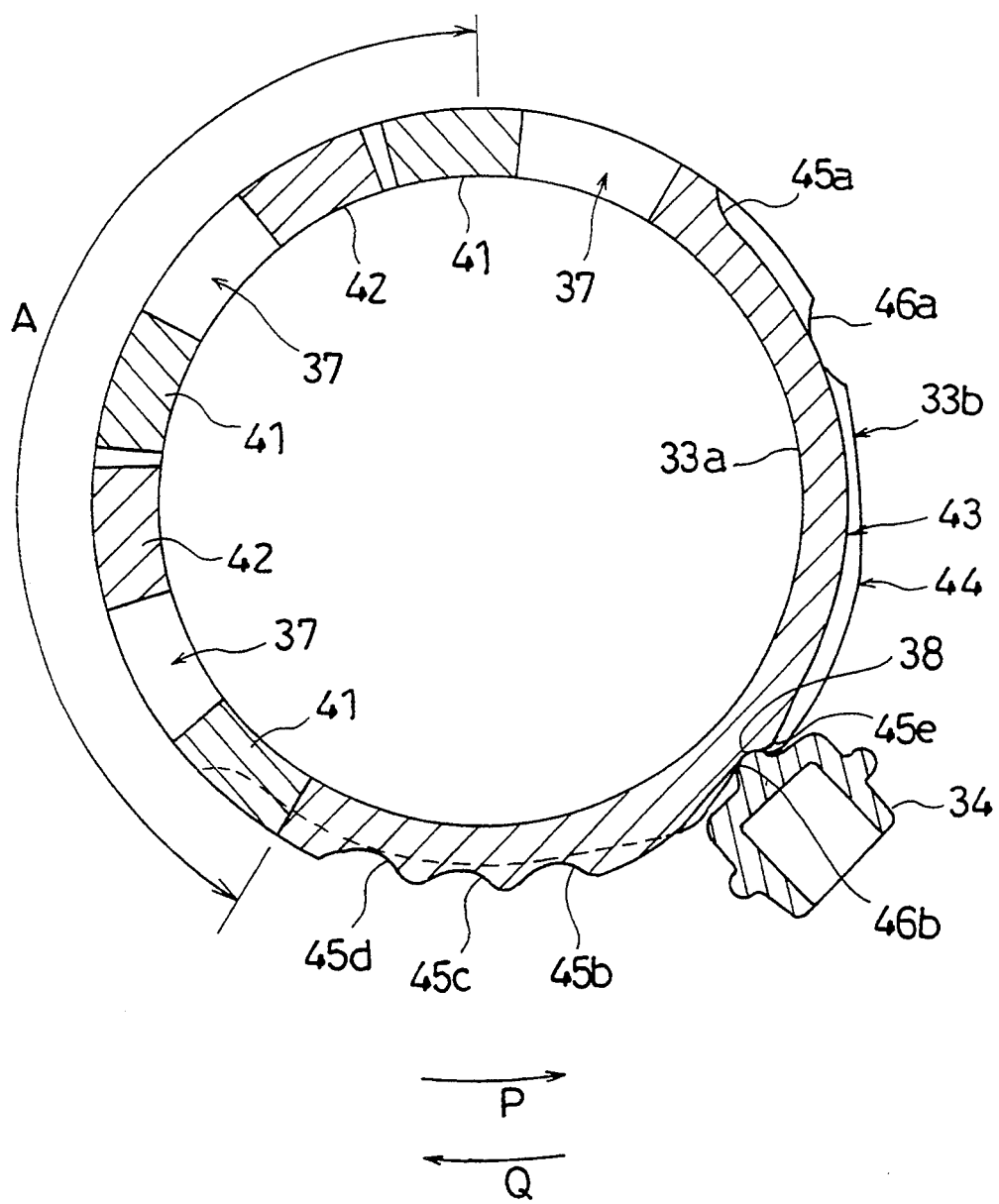
FIG. 21 is a view for describing function of the stepwise retaining mechanism according to the second embodiment.

In the present embodiment, the first cam face 43 is provided with an engaging projection 45e for temporary engagement with the first click ring 33a at the overshift position. Thus, when the rotational operating force applied to the cylindrical operation member 14 is removed, the pawl 38 of the engaging member 34 is engaged with the engaging portion 45e as shown in FIG. 21, thereby holding the first click ring 33a and the cylindrical operation member 14 near the rotational position corresponding to the overshift position.

The engaging portion 45e is formed lower than an edge portion of the engaging portion 46b formed as a groove on the second cam face 44. Thus, by applying to the cylindrical operation member 14 a slight amount of force in the cable paying out direction, the first click ring 33b can be returned easily in the cable paying out direction. Then, as shown in FIG. 22, when the engaging teeth 42 are contacted to the engaging teeth 42, the cylindrical operation member 14 is returned to its true rotational position corresponding to the intermediate sprocket.

Hence, a rider can release overshifting after confirming that the chain is engaged with the intermediate sprocket, resulting in an assured speed change operation.

Figure 22:
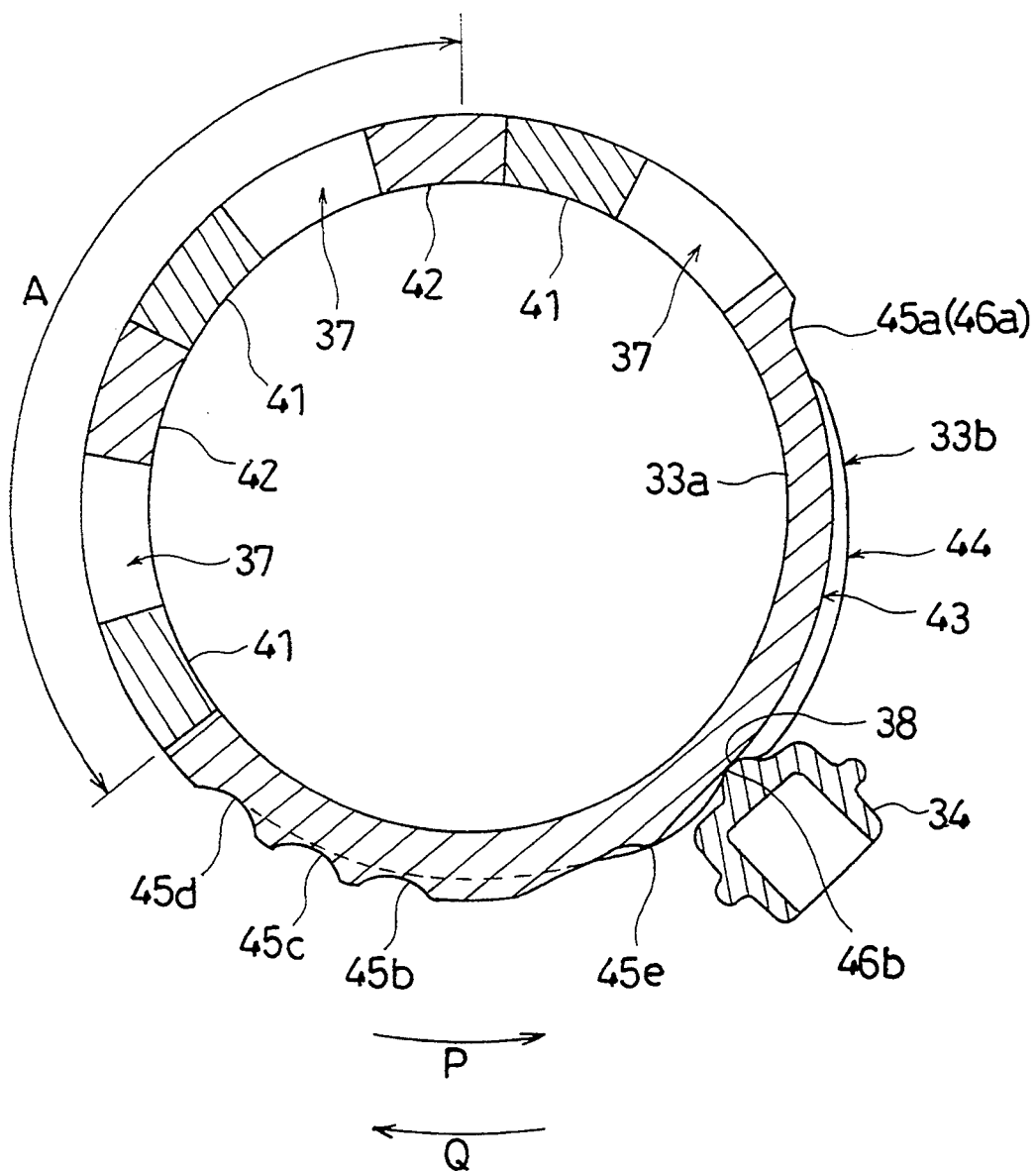
FIG. 22 is a view for describing function of the stepwise retaining mechanism according to the second embodiment.
Figure 23:
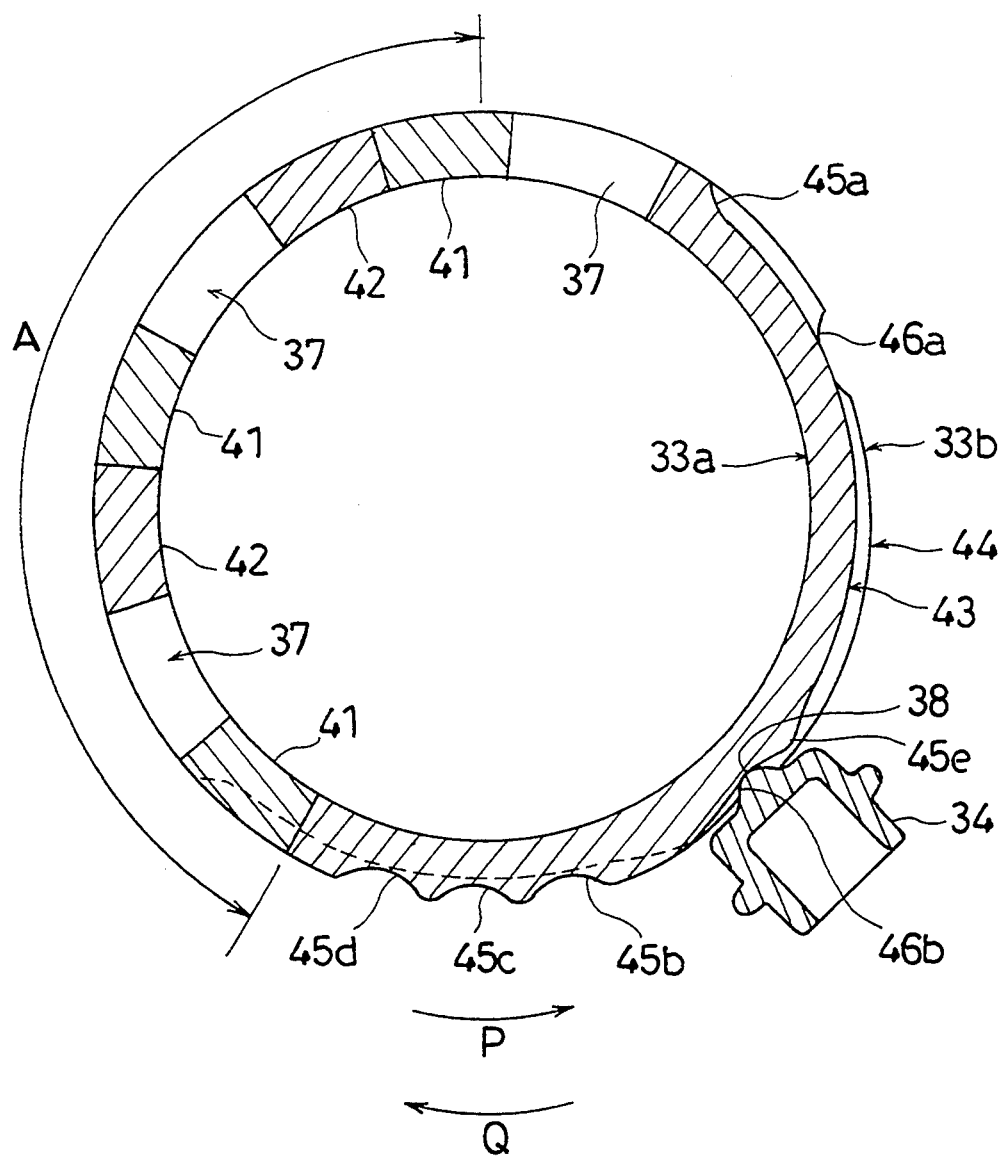
FIG. 23 is a view for describing function of the stepwise retaining mechanism according to the second embodiment.
Figure 24:
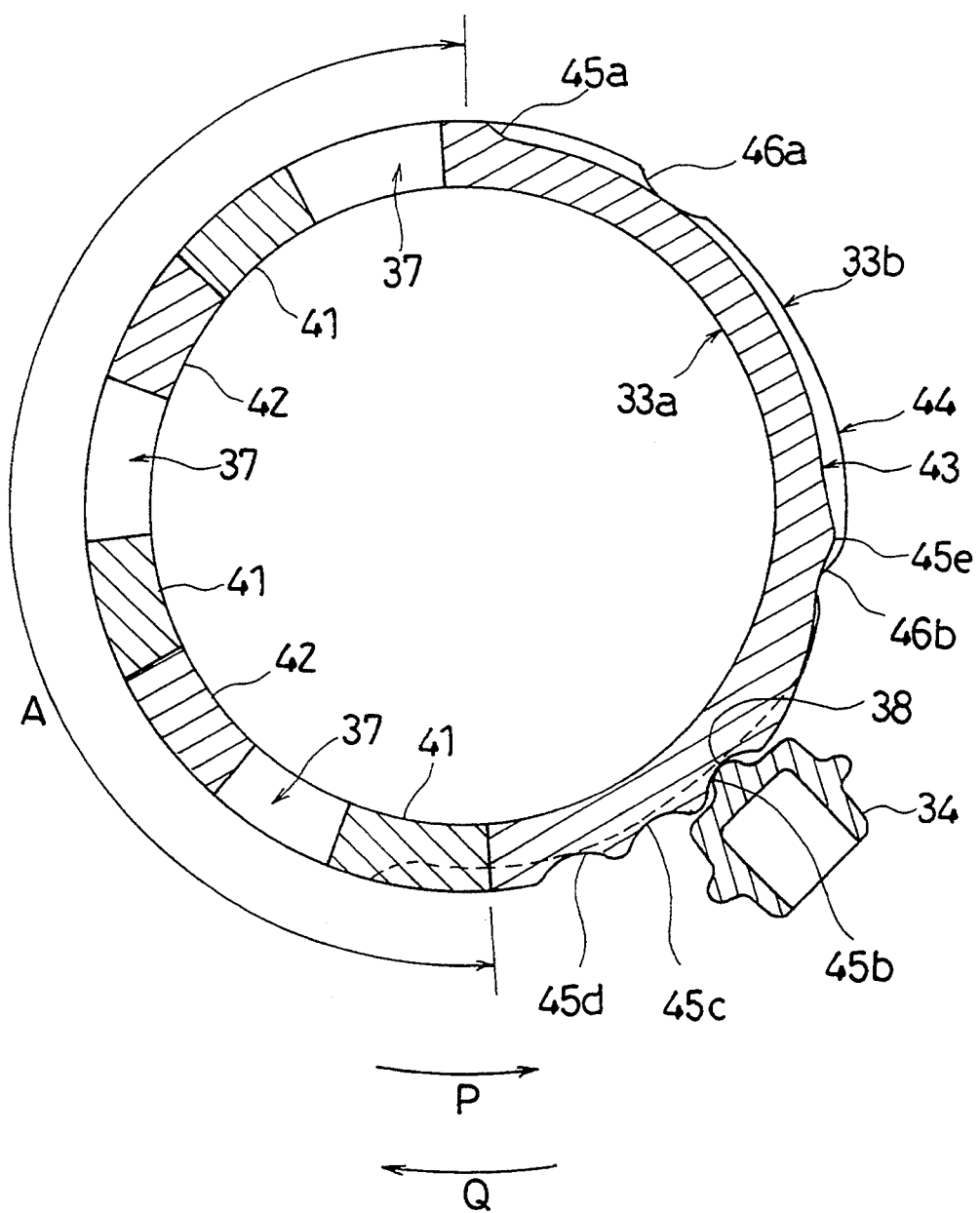
FIG. 24 is a view for describing function of the stepwise retaining mechanism according to the second embodiment.

Next, when the cylindrical operation member 14 is rotated further in the cable winding direction from the rotational position corresponding to the diametrically intermediate sprocket shown in FIG. 22 until it reaches the position corresponding to the diametrically largest sprocket shown in FIG. 24, the engaging member 34 is engaged with the engaging portion 45b formed on the first cam face.

Again, in the present embodiment, the engaging portions 45b, 45c, 45d for correspondence to the diametrically largest sprocket are formed on the first click ring 33a. At an operational position corresponding to the diametrically largest sprocket, overshifting does not occur. Thus, there is no chance for the chain to disengage outward laterally from the diametrically largest sprocket, and it is possible, as in the first embodiment, to provide a sufficient overshift at the operating position corresponding to the diametrically intermediate sprocket.

The provision of the three engaging portions 45b, 45c, 45d for correspondence to the diametrically largest sprocket is for easier correction as in the first embodiment when indexiation becomes out of adjustment.

Next, description will be made for function in a case where the cylindrical operation member 14 is rotated in the cable paying out direction (Arrow Q) from the rotational operation position corresponding to the diametrically largest sprocket.

When the cylindrical operation member 14 is operated in the cable paying out direction from a state shown sin FIG. 24, the first click ring 33a precedes in rotation in the cable paying out direction by its amount of rotational play relative to the second click ring 33b.

Figure 25:
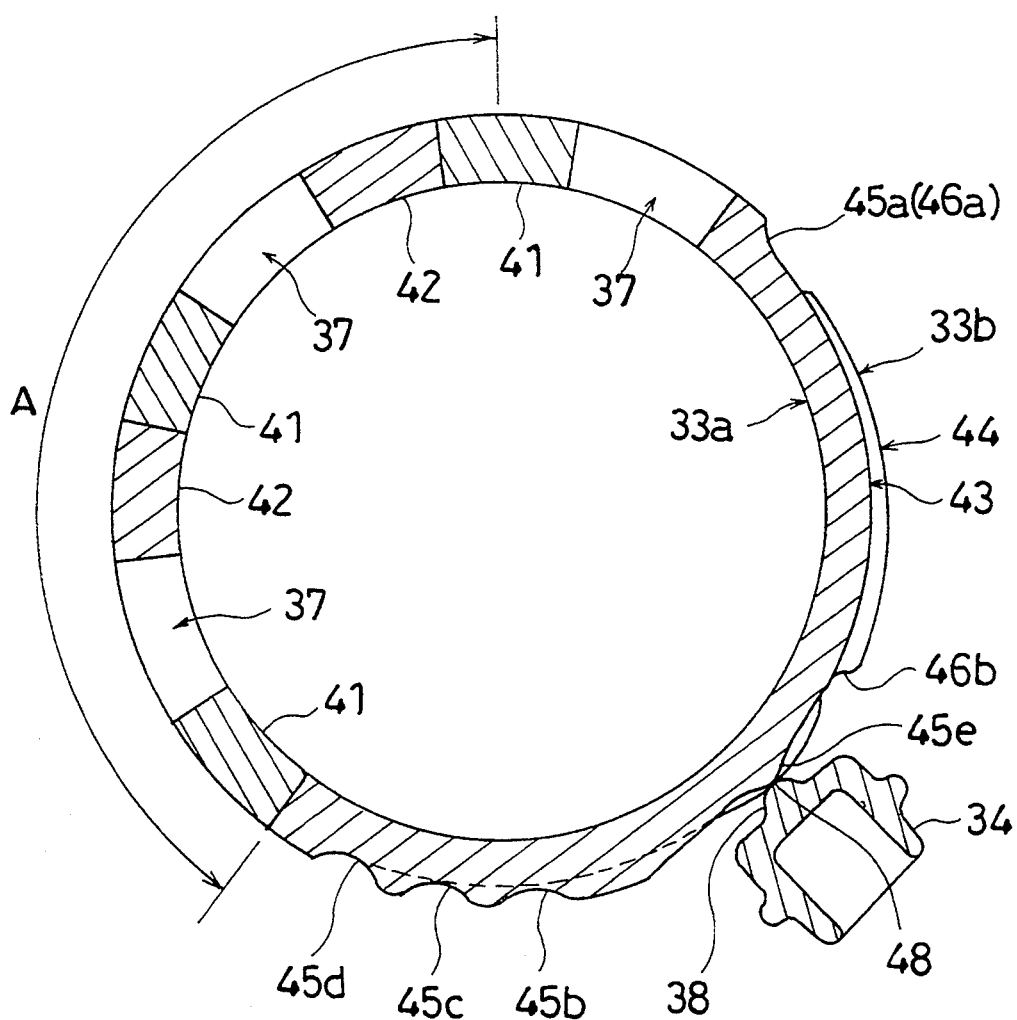
FIG. 25 is a view for describing function of the stepwise retaining mechanism according to the second embodiment.

As described hereinabove, the first click ring 33a is provided with the projecting engaging portion 45e for temporarily holding the cylindrical operation member 14 at the overshift position. As shown in FIG. 25, the second cam face 44 of the second click ring 33b is formed with an engagement prevention region 48 radially taller than the engaging portion 45e. Thus, as shown in FIG. 25, when the cylindrical operation member 14 is rotated in the cable paying out direction, the engaging member 34 is engaged with the engaging portion 46b corresponding to the diametrically intermediate sprocket without engaging the engaging portion 45e.

In other words, the engaging portion 45e for temporarily holding the cylindrical operation member 14 at the overshift position can temporarily hold the cylindrical operation member 14 at the overshift position when the cylindrical operation member is rotated in the cable winding direction whereas the engaging member 34 does not engage with the engaging portion 45e when the cylindrical operation member is rotated in the cable paying out direction. Therefore, there is no generation of unnecessary engaging sound, or resistance caused by engagement between the engaging member 34 and the engaging portion 45e, making possible to perform a smooth speed shift operation.

Engaging sound is not generated at the overshift position when the cylindrical operation member 14 is rotated in the cable paying out direction, as in the first embodiment.

Figure 26:
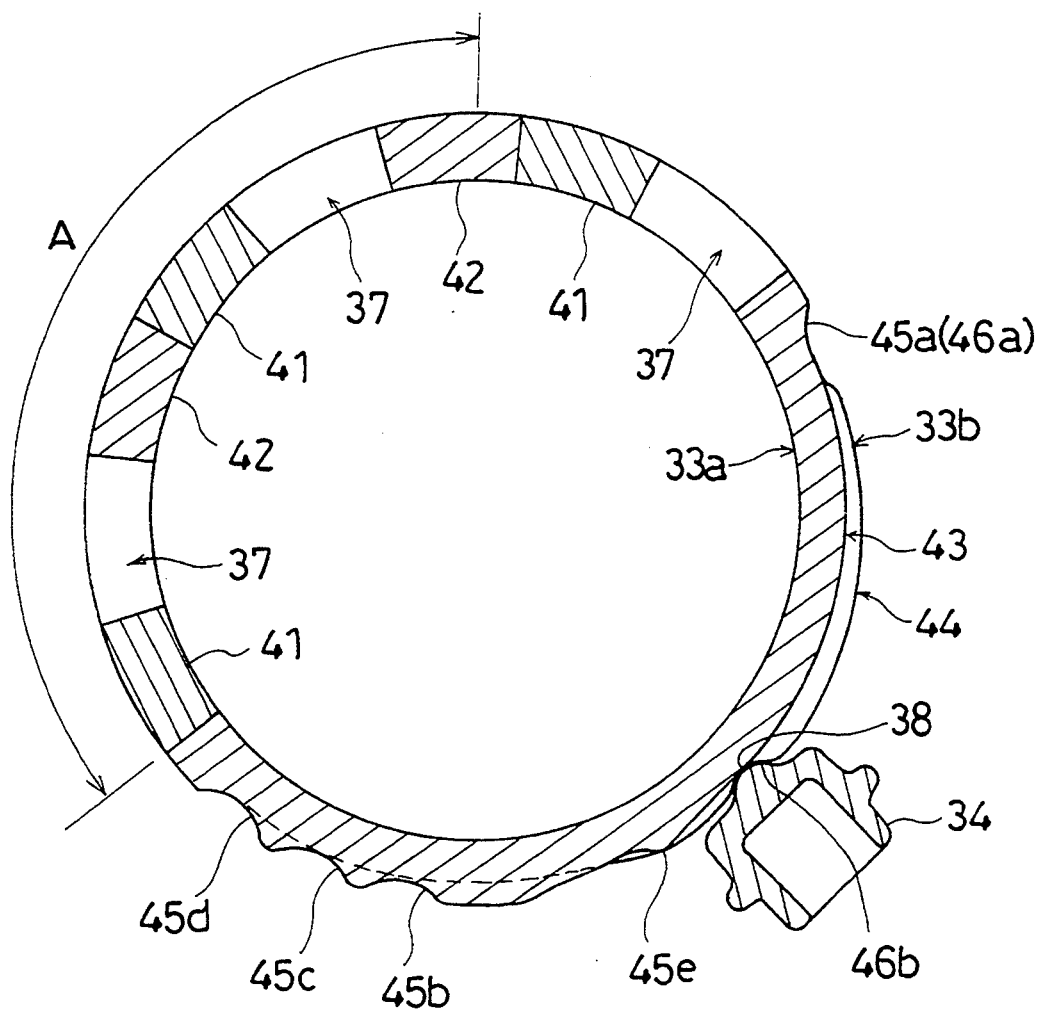
FIG. 26 is a view for describing function of the stepwise retaining mechanism according to the second embodiment.
Figure 27:
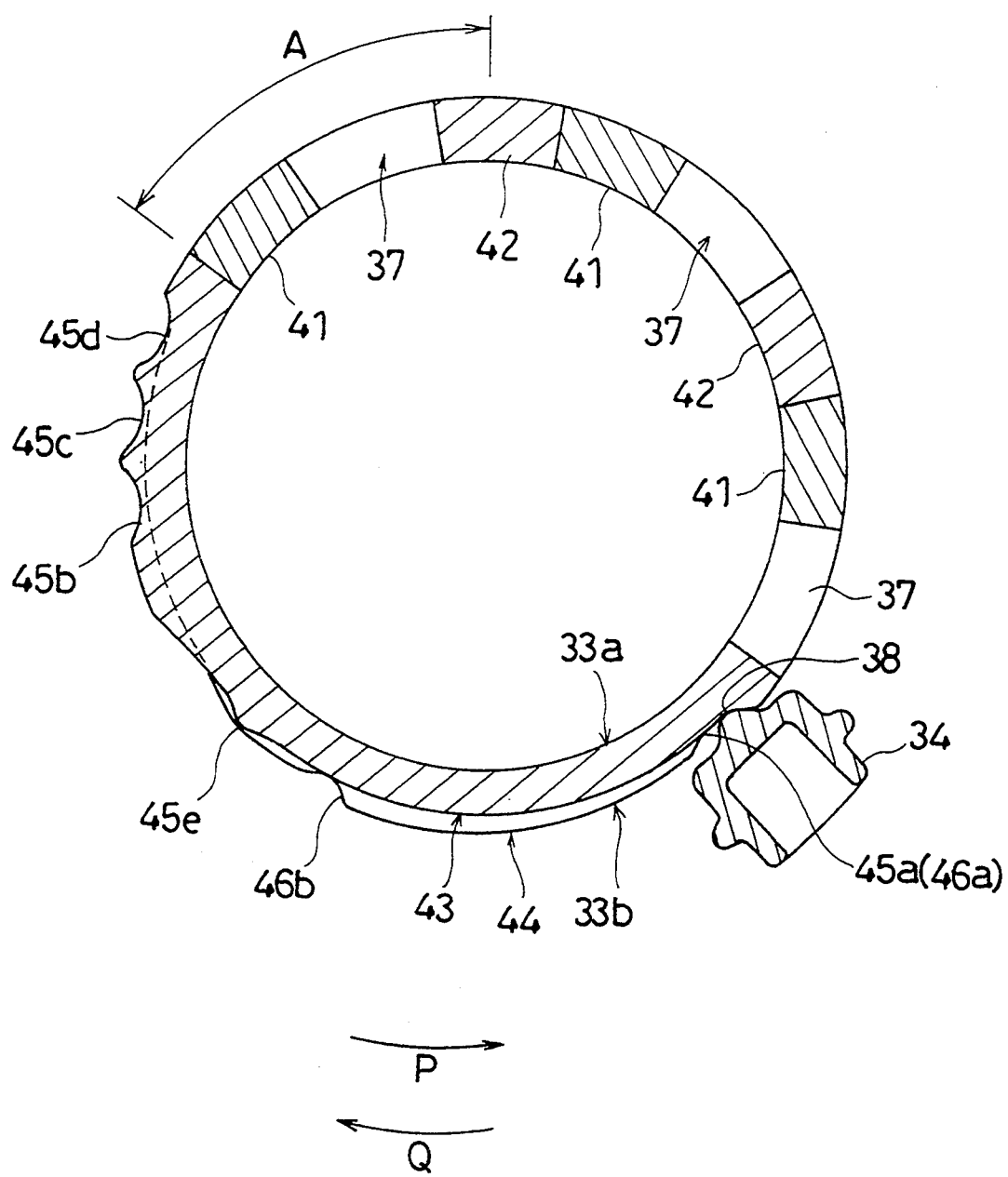
FIG. 27 is a view for describing function of the stepwise retaining mechanism according to the second embodiment.
Figure 28:
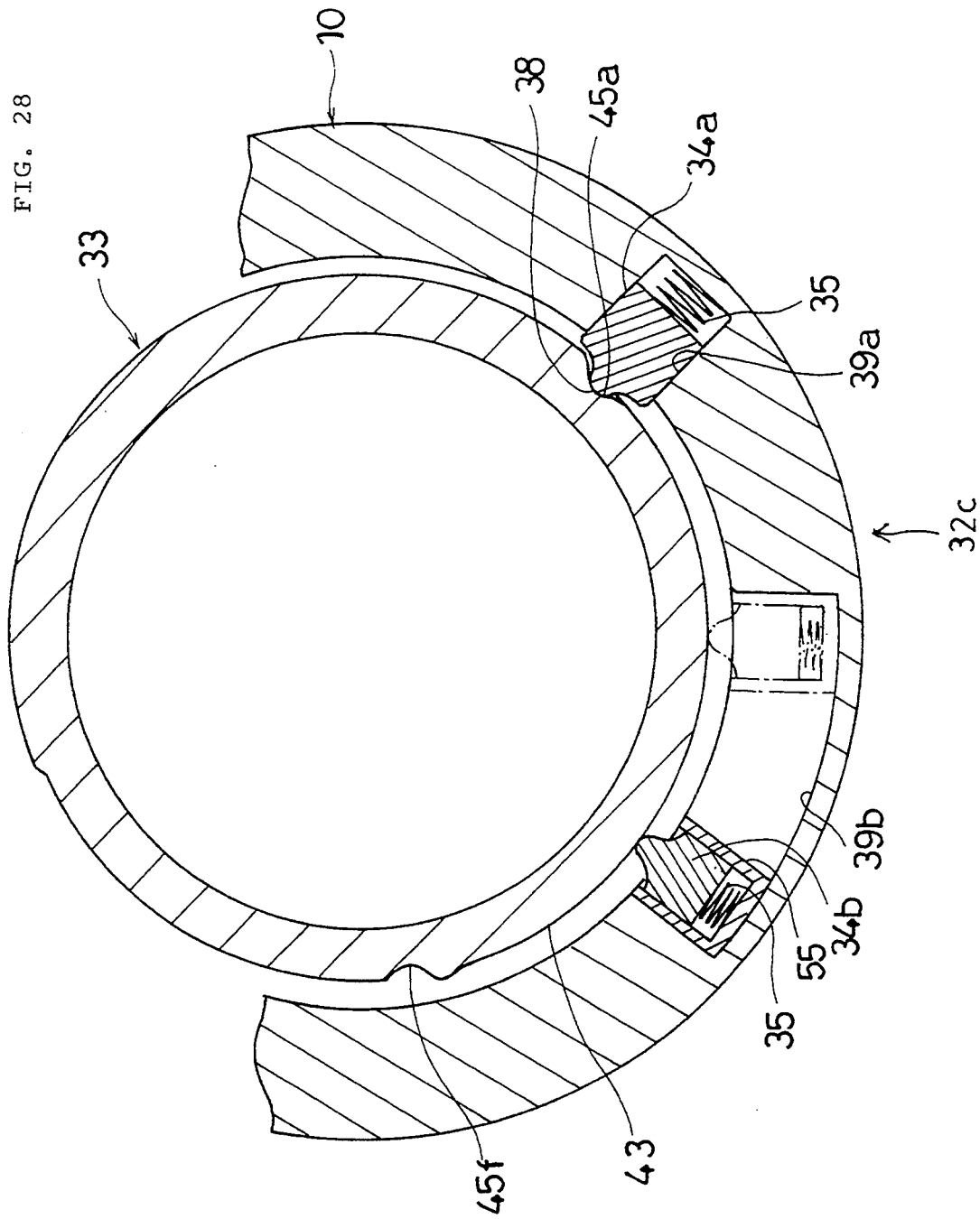
FIG. 28 is a cross-sectional view of a principal portion of a speed change operation assembly according to a third embodiment, corresponding to the view shown in FIG. 10.

When the cylindrical operation member 14 is further rotated in the cable paying out direction from the position corresponding to the diametrically intermediate sprocket as shown in FIG. 26, the rotationally operating position corresponding to the diametrically smallest sprocket is reached.

With the above-described arrangement, it is possible to significantly improve speed change operability as is possible in the first embodiment.

FIGS. 28 through 32 show a third embodiment of the present invention.

A click mechanism 32c according to the present embodiment includes a retaining member 33, an engaging member 34a, and a regulating member 34b.

Like the first embodiment, the retaining member 33 is rotatable integrally with the cylindrical operation member 14. The retaining member 33 is formed on its outer circumference with one cam face 43 for engagement with the engaging member 34a and the regulating member 34b. This cam face 43 is formed with an engaging portion 45a and an engaging portion 45f.

The engaging portion 45a is engaged with the engaging member 34a, thereby holding the cylindrical operation member 14 at a rotational position corresponding to the diametrically smallest sprocket. The engaging portion 45f is engaged with the regulating member 34b, thereby holding the cylindrical operation member 14 at a rotational position corresponding to the diametrically intermediate sprocket, and in addition, is engaged with the engaging member 34a, thereby holding the cylindrical operation member at a rotational position corresponding to the diametrically largest sprocket.

The engaging member 34a, positioned outward radially of the retaining member 33, is slidable inward radially of the handlebar 3, being housed in a housing bore 39a formed in the cylindrical mount 10 of the brake bracket 8 while being elastically contacted to the cam face 43 of the engaging member 33 by the coil spring 35.

The regulating member 34b, circumferentially spaced by a predetermined distance from the engaging member 34a, is housed with the coil spring 35 in a box-shaped sliding member 55, and is slidable inward radially, being elastically contacted to the cam face 43 in the same manner as is the engaging member 34a.

Further, this regulating member 34b is held circumferentially slidable by means of the sliding member 55. The sliding member 55 is held in a circumferential slot 39b having a circumferential length, or the circumferential play of the regulating member 34b, set to correspond to the overshift operation of the cylindrical operation member.

Now, the description will be made for function of the click mechanism 32c arranged as described hereinabove referring to FIGS. 29 through 32. It should be appreciated to note here that for the ease of understanding, the engaging member 34a and the regulating member 34b are illustrated on a straight line in these Figs., as if the engaging member 34a and the regulating member 34b slid on a flat cam surface 43.

Figure 29:
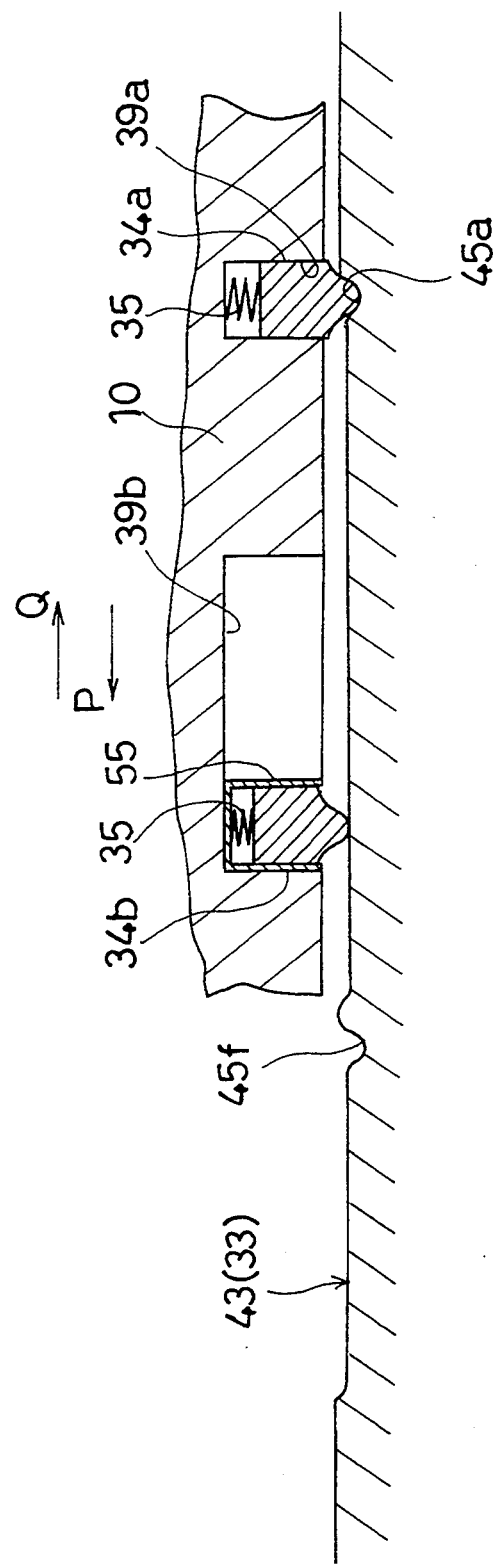
FIG. 29 is a view for describing function of a stepwise retaining mechanism according to the third embodiment.
Figure 30:
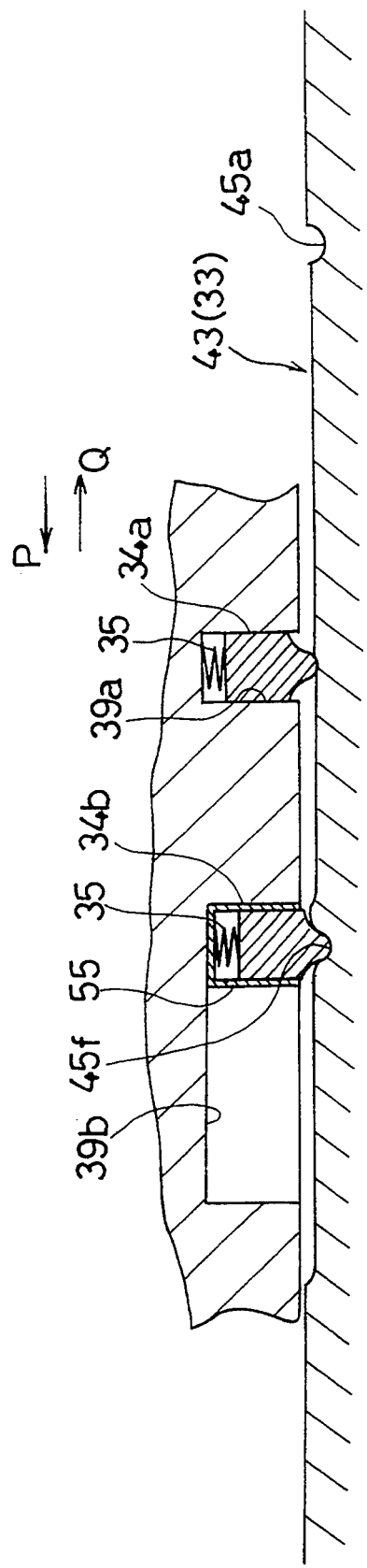
FIG. 30 is a view for describing function of the stepwise retaining mechanism according to the third embodiment.

FIG. 29 shows a state where the engaging member 34a engages with the engaging portion 45a, thereby holding the retainer member 33 or the cylindrical operation member 14 at the rotational position corresponding to the diametrically smallest sprocket.

When the cylindrical operation member 14 is rotated from the state shown in FIG. 29, causing the engaging member 34a and the regulating member 34b to move in the cable winding direction (Arrow P) relative to the retaining member 33, the regulating member 34b is slid to an end relatively in the cable paying out direction, and thereafter, engaged with the engaging portion 45f.

The above state shows a state where the cylindrical operation member 14 or the retaining member 33 has been rotated by an extra amount corresponding to the play of the regulating member 34b, performing an overshifting operation as performed in the first and second embodiments.

Figure 31:
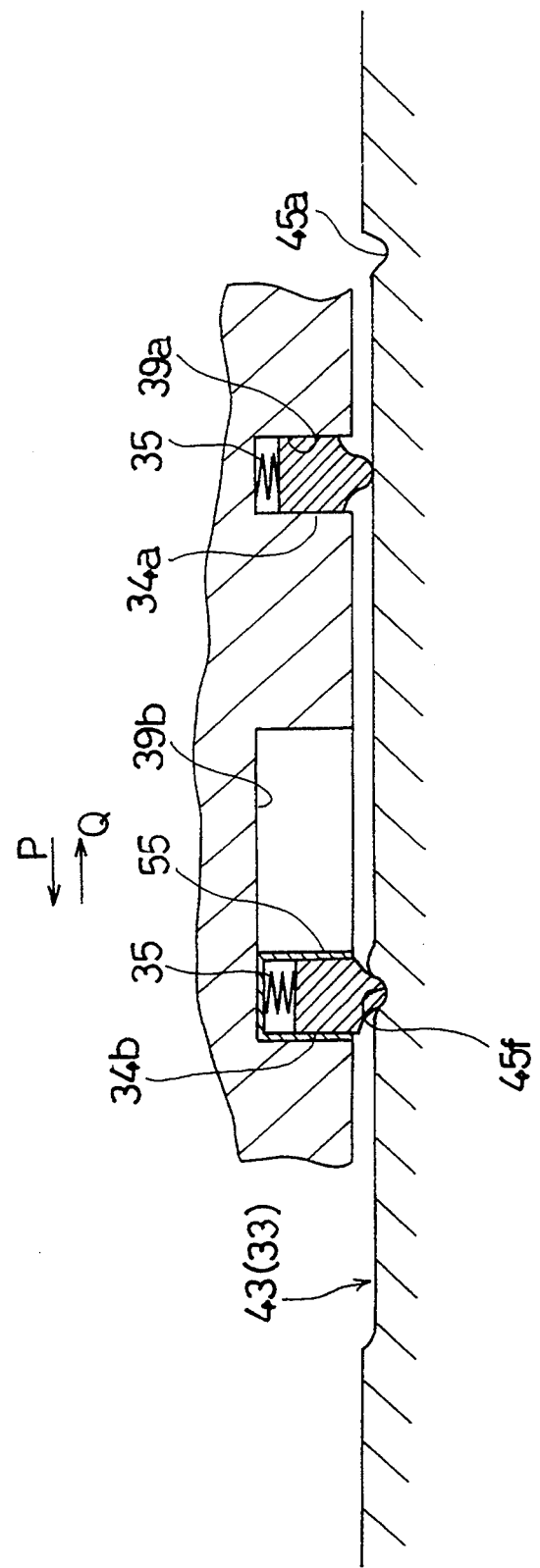
FIG. 31 is a view for describing function of the stepwise retaining mechanism according to the third embodiment.

When an operating force applied to the cylindrical operation member 14 is removed in the above state, the return spring of the speed shifter causes the cylindrical operation member 14 or the retaining member 33 to return to be held at the position corresponding to the diametrically intermediate sprocket as shown in FIG. 31.

Figure 32:
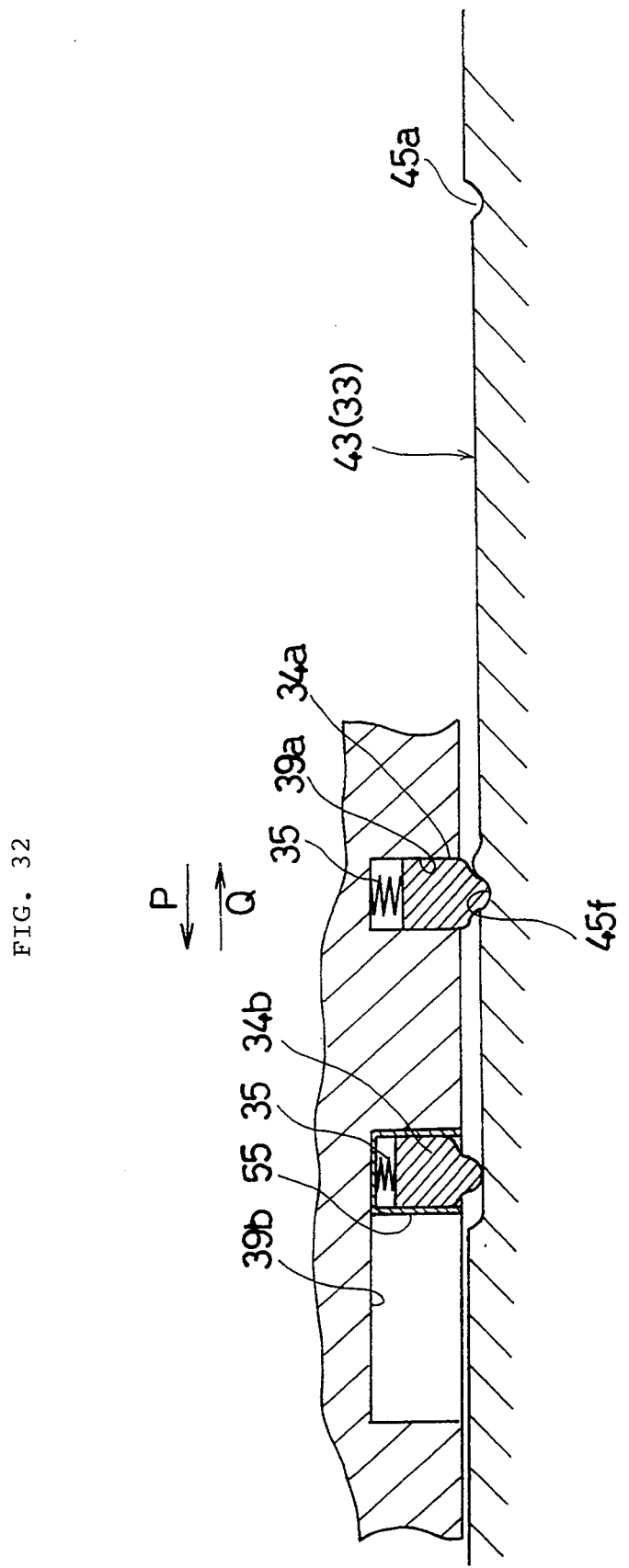
FIG. 32 is a view for describing function of the stepwise retaining mechanism according to the third embodiment.

When the cylindrical operation member 14 is then rotated further in the cable winding direction (Arrow P) beyond the state shown in FIG. 31, the engaging member 34a is engaged with the engaging portion 45f as shown in FIG. 32.

Since the engaging member 34a is not given a play, the cylindrical operation member 14 is held at the state shown in FIG. 32 even if a force applied to the cylindrical operation member is removed. In other words, an overshifting does not occur at the speed shift position corresponding to the diametrically largest sprocket.

As a result, as is possible in the first and second embodiments, it is possible to perform an overshifting only when the chain moves to the diametrically intermediate sprocket, making possible to significantly improve speed change operability.

Figure 33:
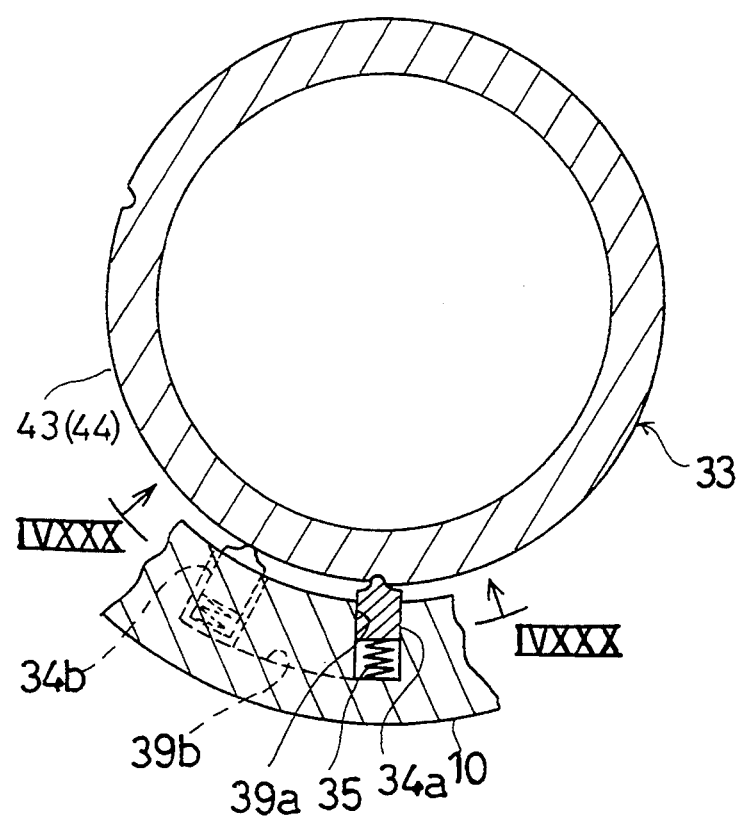
FIG. 33 is a cross-sectional view of a principal portion of a speed change operation assembly according to a fourth embodiment, corresponding to the view shown in FIG. 10.
Figure 34:
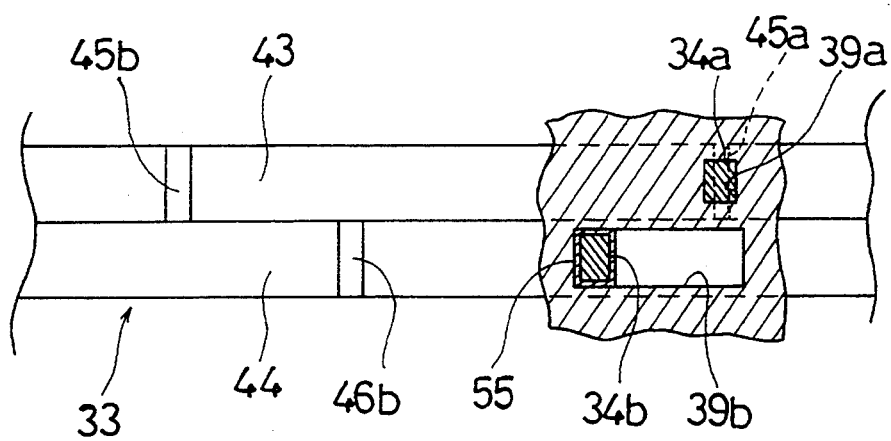
FIG. 34 is a partial cross-sectional view taken along the line IVXXX—IVXXX of FIG. 33.

FIGS. 33 and 34 show a fourth embodiment of the present invention.

In this embodiment, the engaging member 34a and the regulating member 34b are juxtaposed axially of the retaining member 33 rotatable integrally with the cylindrical operation member 14 while the retaining member 33 is provided with two cam faces 43, 44 respectively engagable with the engaging member 34a and the regulating member 34b.

The engaging member 34a is housed with the coil spring 35 in the housing bore 39a formed at a predetermined circumferential position, being elastically contacted to the first cam face 43. On the other hand, the regulating member 34b is housed in a circumferential slot 39b by means of the sliding member 55 as in the third embodiment, being held to be circumferentially playable by means of the slot 39b. A playable distance of the regulation member 34b is set to correspond to an overshifting operation of the cylindrical operation member 14.

The first cam face 43 is formed with the engaging portion 45a for holding the cylindrical operating member 14 at a rotational position corresponding to the diametrically smallest sprocket, and the engaging portion 45b for holding the same at a rotational position corresponding to the diametrically largest sprocket.

Therefore, by providing the regulating member 34b which is playable, it is possible to allow an overshifting to occur only when the chain shifts from the diametrically smallest sprocket to the diametrically intermediate sprocket, making possible to significantly improve speed change operability as in the first and second embodiments.

Figure 35:
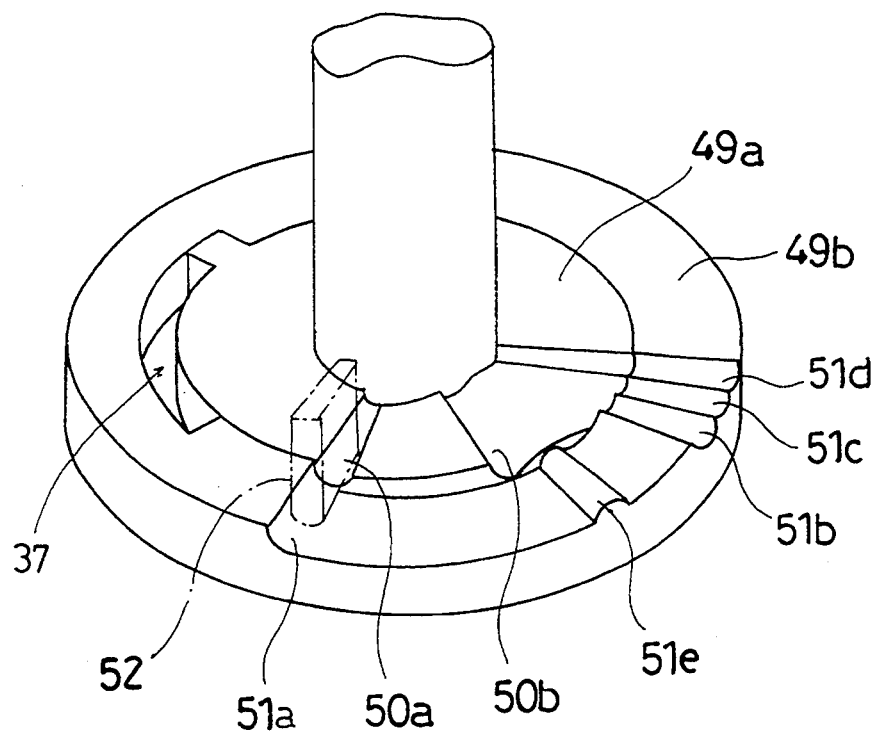
FIG. 35 is a view showing a principal portion for a case where the present invention is applied to a speed change operation assembly having a disc-shaped retaining member.

FIG. 35 shows a fifth embodiment of the present invention.

In this embodiment, a disc-shaped retaining member 49a and a doughnut-shaped regulating member 49b concentrically thereto are respectively provided with cam faces formed with engaging portions 50a, . . . , 51a . . . for successive engagement with an engaging member 52. With the above arrangement, it is possible to bring the same effect as in the first through fourth embodiments.

In the embodiments, the present invention is applied to a speed change operation assembly for operating a front speed shifter; however, it is possible to apply the same to a speed shift operation assembly for operating a rear speed shifter.

Further, in the first embodiment, one engaging member 34 is provided for engaging in a bridge-like manner with the first click ring as the retaining member and the second click ring as the regulating member; however, it also possible to provide two or more engaging members each engaging separately with the first or second click ring.

Still further, in the embodiments, an arrangement is made for winding or paying out the inner wire t1 of the speed control cable T by means of the cable winding reel 16 and the drive cable K; however, it is also possible to arrange for winding or paying out the inner wire t1 directly by means of the cylindrical operation member 14.

Moreover, in the embodiments, the present invention is applied to a front derailleur having three sprockets; however, it is also possible to apply to a derailleur having two, four, or more sprockets.

Still more, it is also possible to employ a retaining member having an inner circumferential cam face provided in the cylindrical mount whereas the engaging member and the regulating members engagable with the retaining member are held projectably toward the retaining member.

I claim:

1. A bicycle speed change operation assembly comprising a speed change operation member rotatably supported at a suitable portion of a bicycle body, and a stepwise retaining mechanism for retaining the speed change operation member stepwise at predetermined rotational positions; the speed change operation member being rotated to pull or pay out a control cable for activating a speed shifter; wherein the stepwise retaining mechanism includes:
   a retaining member rotatable integrally with the speed change operation member:
   an engaging member engagable with the retaining member for retaining the speed change operation member at a predetermined rotational position: and
   a regulating member juxtaposed to one of the retaining member and the engaging member with a predetermined play relative thereto while being engagable with the other of the retaining member and the engaging member for retaining the speed change operation member at a predetermined rotational position.

2. The bicycle speed change operation assembly according to claim 1, wherein the play is set to correspond to an overshift operation of the speed change operation member.

3. The bicycle speed change operation assembly according to claim 1, wherein the regulating member is juxtaposed to the retaining member, each of the regulating member and the retaining member being provided with a cam face having an engaging portion for engagement with the engaging member.

4. The bicycle speed change operation assembly according to claim 1, wherein the regulating member is juxtaposed to the engaging member, each of the regulating member and the engaging member being provided with a cam face having an engaging portion for engagement with the retaining member.

5. The bicycle speed change operation assembly according to claim 1, wherein the regulating member is juxtaposed to the retaining member, the engaging member being provided with a cam face having an engaging portion for engagement with the regulating and engagable members.

6. The bicycle speed change operation assembly according to claim 1, wherein the regulating member is juxtaposed to the engaging member, the retaining member being provided with a cam face having an engaging portion for engagement with the regulating and engaging members.

7. A bicycle speed change operation assembly comprising a speed change operation member rotatably supported at a suitable portion of a bicycle body, and a stepwise retaining mechanism for retaining the speed change operation member stepwise at predetermined rotational positions; the speed change operation member being rotated to pull or pay out a control cable for activating a speed shifter; wherein the stepwise retaining mechanism includes:
   a retaining member provided with a first cam face while being rotatable integrally with the speed change operation member:
   a regulating member provided with a second cam face while being juxtaposed to the retaining member for rotation relative thereto within a predetermined play: and
   an engaging member for successive elastic engagement with engaging portions formed on one or both of the first and second cam faces for retaining the speed change operation member at predetermined rotational positions by means of the retaining member or regulating member in response to the operation of the speed change operation member.

8. The bicycle speed change operation assembly according to claim 7, wherein one of the first and second cam faces is provided with an engaging portion for receiving the engaging member when the regulating member is at one end of its play relative to the retaining member whereas the other of the first and second cam faces is provided with an engagement preventing region for preventing the engaging member from engaging with the engaging portion when the regulating member is at the other end of the play relative to the retaining member.

9. The bicycle speed change operation assembly according to claim 7, wherein the first cam face is provided with an engaging portion for retaining the speed change operation member at an end position of its rotational movement in a cable winding direction.

10. The bicycle speed change operation assembly according to claim 7, wherein the engaging member is engaged with the first and second cam faces in a bridge-like manner.

11. The bicycle speed change operation assembly according to claim 7, wherein the stepwise retaining mechanism is provided with a plurality of engaging members each engagable with the first and second cam faces.

12. A bicycle speed change operation assembly comprising a speed change operation member rotatably supported at a suitable portion of a bicycle body, and a stepwise retaining mechanism for retaining the speed change operation member stepwise at predetermined rotational positions; the speed change operation member being rotated to pull or pay out a control cable for activating a speed shifter; wherein the stepwise retaining mechanism includes:
   a retaining member provided with a first and second cam faces while being rotatable integrally with the speed change operation member:
   an engaging member for successive elastic engagement with an engaging portion formed on the first cam face in response to the rotational operation of speed change operation member: and
   a regulating member juxtaposed to the engaging member with a predetermined play relative thereto while being elastically and successively engageable with an engaging portion formed on the second cam face.

* * * * *